US012802042B2

(12) United States Patent
Yoshizawa et al.

(10) Patent No.: US 12,802,042 B2
(45) **Date of Patent: *Nov. 17, 2026**

(54) INFORMATION DISPLAY DEVICE AND ACTIVITY PLAN DISPLAY SYSTEM

(71) Applicant: MAXELL, Ltd., Kyoto (JP)

(72) Inventors: Kazuhiko Yoshizawa, Kyoto (JP); Osamu Kawamae, Kyoto (JP); Hitoshi Akiyama, Kyoto (JP); Mayumi Nakade, Kyoto (JP); Megumi Kurachi, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/042,363

(22) Filed: Jan. 31, 2025

(65) Prior Publication Data

US 2025/0182060 A1 Jun. 5, 2025

Related U.S. Application Data

(63) Continuation of application No. 17/604,685, filed as application No. PCT/JP2019/016887 on Apr. 19, 2019, now Pat. No. 12,248,910.

(51) Int. Cl.
*G06Q 10/10* (2023.01)
*G06Q 10/1093* (2023.01)
(Continued)

(52) U.S. Cl.
CPC ......... *G06Q 10/1093* (2013.01); *G06V 20/52* (2022.01); *G06V 40/172* (2022.01)

(58) Field of Classification Search
CPC ..................................................... G06Q 10/10
See application file for complete search history.

(56) References Cited

U.S. PATENT DOCUMENTS

2012/0314067 A1* 12/2012 Kitabayashi ............. H04N 7/15 348/143
2015/0012307 A1* 1/2015 Moss ..................... G06Q 10/02 705/5

(Continued)

FOREIGN PATENT DOCUMENTS

JP 2005-084909 A 3/2005
JP 2012-068481 A 4/2012

(Continued)

OTHER PUBLICATIONS

Jesper Sjoberg, Making use of the environmental space in augmented reality, Umea University Department of Applied Physics and Electronics SE-901 87 Umea Sweden, Jan. 10, 2019. (Year: 2019).*

(Continued)

*Primary Examiner* — Kurtis Gills
(74) *Attorney, Agent, or Firm* — Rimon P.C.

(57) ABSTRACT

An information display device for displaying activity schedule of an assigned user provided with one of seats in advance, detects position and direction of the information display device; acquires distance from the information display device to a display target seat of an assigned user whose activity schedule is to be displayed; uses the position, the direction, and the distance to calculate display seat position of the display target seat; extracts, from a table which registers assigned user information of assigned users of the seats in association with registration seat position of the seats, one piece of the assigned user information registered in association with one piece of the registration seat position which is closest to the display seat position; acquires current activity schedule registered in association with the one piece of the assigned user information; and displays the acquired activity schedule on a display unit.

20 Claims, 31 Drawing Sheets

(51) Int. Cl.
*G06V 20/52* (2022.01)
*G06V 40/16* (2022.01)

(56) References Cited

U.S. PATENT DOCUMENTS

| | | | | |
|---|---|---|---|---|
| 2015/0161525 | A1* | 6/2015 | Hirose | G06Q 10/02 705/5 |
| 2018/0247023 | A1 | 8/2018 | Divine et al. | |
| 2018/0247454 | A1 | 8/2018 | Sawaki et al. | |
| 2019/0111806 | A1* | 4/2019 | Camuti | B60N 2/002 |

FOREIGN PATENT DOCUMENTS

| | | | | |
|---|---|---|---|---|
| JP | 2013-218511 | A | 10/2013 | |
| JP | 2016-192746 | A | 11/2016 | |
| JP | 2018-124907 | A | 8/2018 | |
| WO | 2018/156192 | A1 | 8/2018 | |
| WO | WO-2018217214 | A1 * | 11/2018 | G06Q 10/02 |
| WO | WO-2021050074 | A1 * | 3/2021 | G01C 21/206 |

OTHER PUBLICATIONS

Notice of Allowance issued Nov. 4, 2024 in U.S. Appl. No. 17/604,685.

Final Office Action issued Apr. 11, 2024 in U.S. Appl. No. 17/604,685.

Non-Final Office Action issued Nov. 13, 2023 in U.S. Appl. No. 17/604,685.

Office Action issued in the corresponding Japanese patent Application No. 2023-060505 dated Apr. 2, 2024, w/ English Translation.

International Search Report issued in corresponding International Application No. PCT/JP2019/016887, dated Jul. 2, 2019 w/English Translation.

* cited by examiner

FIG. 6

250

| SEAT INFORMATION (251) | | | USER INFORMATION (256) | |
|---|---|---|---|---|
| SEAT ID (252) | ROOM ID (253) | SEAT POSITION INFORMATION (254) | NAME (257) | PERSONAL ID (258) |
| 000001 | 001 | (xxx.xxxx, xxx.xxxx) | Taro Tokyo | 000001 |
| 000002 | 001 | (xxx.xxxx, xxx.xxxx) | Hanako Osaka | 000002 |
| 000003 | 001 | (xxx.xxxx, xxx.xxxx) | Ichiro Nagoya | 000003 |
| ⋮ | ⋮ | ⋮ | ⋮ | ⋮ |
| 001999 | 029 | (xxx.xxxx, xxx.xxxx) | Mutsuko Aomori | 001999 |

FIG. 8

311

311b 311a 311c 311d 311e

| PERSONAL INFORMATION | | FACE IMAGE FOR AUTHENTICATION | MOBILE DEVICE INFORMATION |
|---|---|---|---|
| NAME | PERSONAL ID | | |
| Taro Tokyo | 000001 | taro-tokyo.jpg | xx.xx.xx.xx.xx.xx |
| Hanako Osaka | 000002 | hanako-osaka.jpg | xx.xx.xx.xx.xx.xx |
| Ichiro Nagoya | 000003 | ichiro-nagoya.jpg | xx.xx.xx.xx.xx.xx |
| ⋮ | ⋮ | ⋮ | ⋮ |
| Mutsuko Aomori | 001999 | mutsuko-aomori.jpg | xx.xx.xx.xx.xx.xx |

FIG. 9

312

312b 312a 312c 312d 312e 312j 312f 312g 312h 312i

| PERSONAL INFORMATION | | ACTIVITY SCHEDULE INFORMATION | | | | | |
|---|---|---|---|---|---|---|---|
| NAME | PERSONAL ID | No. | START DATE AND TIME | END DATE AND TIME | CONTENT | LOCATION | DISCLOSURE |
| Taro Tokyo | 000001 | 001 | 20xx/xx/xx xx:xx | 20xx/xx/xx xx:xx | MEETING | MEETING ROOM No.1 | ○ |
| | | 002 | 20xx/xx/xx xx:xx | 20xx/xx/xx xx:xx | OFFICIAL TRIP | Hxxx COMPANY | △ |
| | | 003 | 20xx/xx/xx xx:xx | 20xx/xx/xx xx:xx | GOING OUT ON PRIVATE | — | × |
| | | ... | ... | ... | ... | ... | ... |
| Hanako Osaka | 000002 | 001 | 20xx/xx/xx xx:xx | 20xx/xx/xx xx:xx | MEETING | RECEPTION ROOM No.1 | △ |
| | | ... | ... | ... | ... | ... | ... |
| Ichiro Nagoya | 000003 | 001 | 20xx/xx/xx xx:xx | 20xx/xx/xx xx:xx | OFFICIAL TRIP | Mxxx COMPANY | ○ |
| | | ... | ... | ... | ... | ... | ... |
| ... | ... | ... | ... | ... | ... | ... | ... |
| Mutsuko Aomori | 001999 | 001 | 20xx/xx/xx xx:xx | 20xx/xx/xx xx:xx | GOING OUT ON PRIVATE | — | × |
| | | ... | ... | ... | ... | ... | ... |

FIG. 25

313

313b 313a 313c 313d 313e 313f 313g

| PERSONAL INFORMATION | | LOG-IN ID | LOG-IN PW | OPERATION STATUS | LOG-OUT TIME |
|---|---|---|---|---|---|
| NAME | PERSONAL ID | | | | |
| Taro Tokyo | 000001 | Taro-Tokyo | t******* | On-line | 20xx/xx/xx xx:xx:xx |
| Hanako Osaka | 000002 | Hanako-Osaka | h******* | On-line | 20xx/xx/xx xx:xx:xx |
| Ichiro Nagoya | 000003 | Ichiro-Nagoya | i******* | Off-line | 20xx/xx/xx xx:xx:xx |
| ... | ... | ... | ... | ... | ... |
| Mutsuko Aomori | 001999 | Mutsuko-Aomori | m******* | On-line | 20xx/xx/xx xx:xx:xx |

FIG. 28

314

314a 314b 314d 314c 314e 314f

| ROOM ID | CAMERA ID | CAMERA ARRANGEMENT INFORMATION | | IMAGE STORAGE ADDRESS |
|---|---|---|---|---|
| | | CAMERA POSITION INFORMATION | CAMERA DIRECTION INFORMATION | |
| 001 | c0011 | (xxx.xxxx, yyy.yyyy, zzz.zzzz) | | |
| 001 | c0012 | (xxx.xxxx, yyy.yyyy, zzz.zzzz) | | |
| 002 | c0021 | (xxx.xxxx, yyy.yyyy, zzz.zzzz) | | |
| ⋮ | ⋮ | ⋮ | | |
| 029 | c0291 | (xxx.xxxx, yyy.yyyy, zzz.zzzz) | | |

INFORMATION DISPLAY DEVICE AND ACTIVITY PLAN DISPLAY SYSTEM

CROSS REFERENCE

This application is a Continuation of U.S. patent application Ser. No. 17/604,685, filed Oct. 18, 2021, which is the U.S. National Phase under 35 U.S.C. § 371 of International Application No. PCT/JP2019/016887, filed on Apr. 19, 2019, and the entire contents of each are hereby incorporated by reference.

TECHNICAL FIELD

The present invention relates to an information display technique, especially, a technique for displaying schedule information of an absentee.

BACKGROUND ART

There has been a technique for presenting information on activity schedules of an absentee in an office or the like. For example, Patent Literature 1 discloses "an information processing system, which uses a smart device including imaging means and display means, comprising: reading means for, in a case where an AR marker is included in a live video imaged by using the imaging means, reading from a database a seat position in the live video and an identifier associated with the AR marker; determination means for determining whether a person corresponding to the seat position is present or absent, on the basis of the live video; presence information reading means for specifying the person who is determined to be absent by using the identifier, and reading presence information on the specified person from the presence database; and display control means for making the display means display the presence information so as to be superposed on the live video" (excerpted from Abstract).

CITATION LIST

Patent Literature

Patent Literature 1: JP-A-2016-192746

SUMMARY OF INVENTION

Technical Problem

However, according to the technique disclosed in Patent Literature 1, an AR marker (for example, barcode/QR code (registered trademark)) has to be arranged in advance on a specific location of each desk or each room to present activity schedules as presence information of members in an office. In addition, in the case where the AR marker is out of a photographing range, such as when the AR marker is arranged behind something or arranged at a blind spot, the AR marker does not function correctly. In this way, the technique disclosed in Patent Literature 1 takes labor as well as has many constraints.

The present invention has been made in view of the circumstances above, and an object of the present invention is to provide a technique for displaying activity schedule information of a member while reducing labor and constraints for preparation as much as possible.

Solution to Problem

The present invention provides an information display device for displaying activity schedule information of an assigned user who has been provided with one of seats in advance, the information display device including: an own device arrangement information detection unit configured to detect position information and direction information of the information display device; a distance information acquisition unit configured to acquire distance information from the information display device to a display target seat that is a seat assigned to an assigned user whose activity schedule information is to be displayed; a seat position calculation unit configured to use the position information, the direction information, and the distance information to calculate, as position information of the display target seat, display seat position information; an activity schedule acquisition unit configured to extract, for each of the seats, from a seat information table which registers assigned user information of assigned users of the seats in association with registration seat position information that is position information of the seats, one piece of the assigned user information registered in association with one piece of the registration seat position information which is closest to the display seat position information, and acquire current activity schedule information among the activity schedule information registered in association with the one piece of the assigned user information; and a display control unit configured to display the acquired activity schedule information on a display unit of the information display device.

Furthermore, the present invention provides an activity schedule display system including: a management server; and an information display device, the activity schedule display system being configured to display activity schedule information of an assigned user who has been provided with one of seats in advance, the management server including an activity schedule database in which the activity schedule information of the assigned user is managed in association with assigned user information that is information for identifying the assigned user, the information display device including: an own device arrangement information detection unit configured to detect position information and direction information of the information display device; a distance information acquisition unit configured to acquire distance information from the information display device to a display target seat that is a seat of an assigned user whose activity schedule information is to be displayed; a seat position calculation unit configured to use the position information, the direction information, and the distance information to calculate, as position information of the display target seat, display seat position information; an activity schedule acquisition unit configured to extract, for each of the seats, from a seat information table which registers the assigned user information in association with registration seat position information that is position information of the seats, one piece of the assigned user information registered in association with one piece of the registration seat position information which is closest to the display seat position information, and acquire, from the activity schedule database in the management server, current activity schedule information among the activity schedule information registered in association with the one piece of the assigned user information; and a display control unit configured to display the acquired activity schedule information on a display unit of the information display device.

Advantageous Effects of Invention

According to the present invention, it is possible to provide a technique for displaying activity schedule information of a member while reducing labor and constraints for preparation as much as possible. The problems, configurations, and advantageous effects other than those described above will be clarified by explanation of the embodiments below.

Figure 3A:
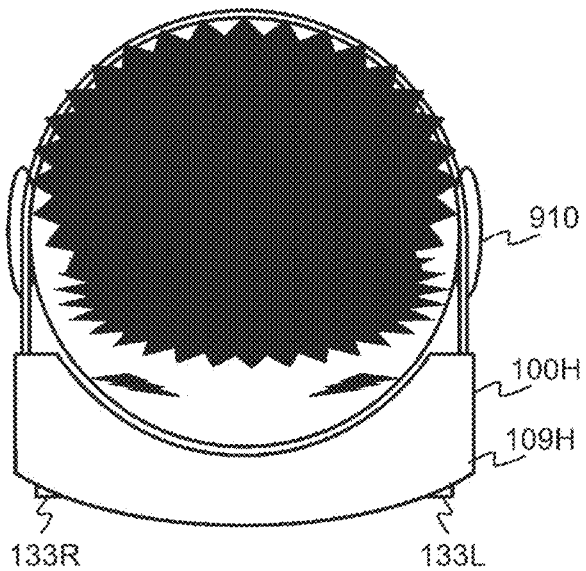
Figure 3B:
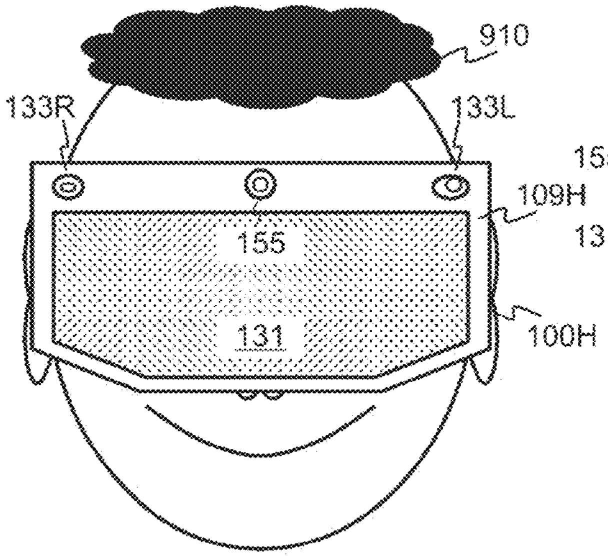
Figure 3C:
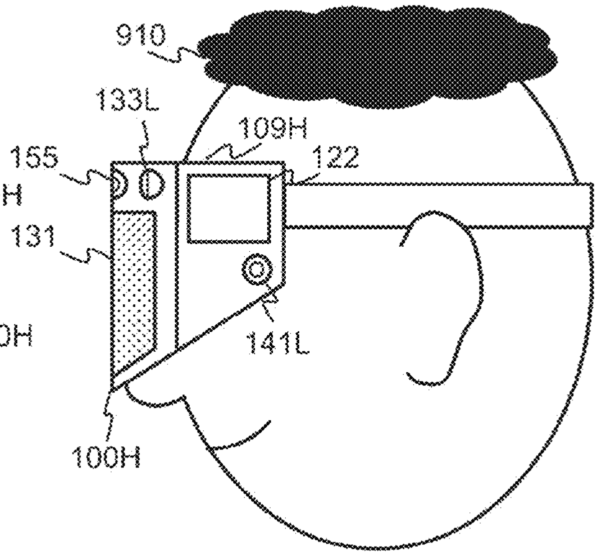

Each FIG. 3A to FIG. 3C illustrates an appearance of the information display device in the case where the information display device according to the first embodiment is a head-mounted display.

Figure 4A:
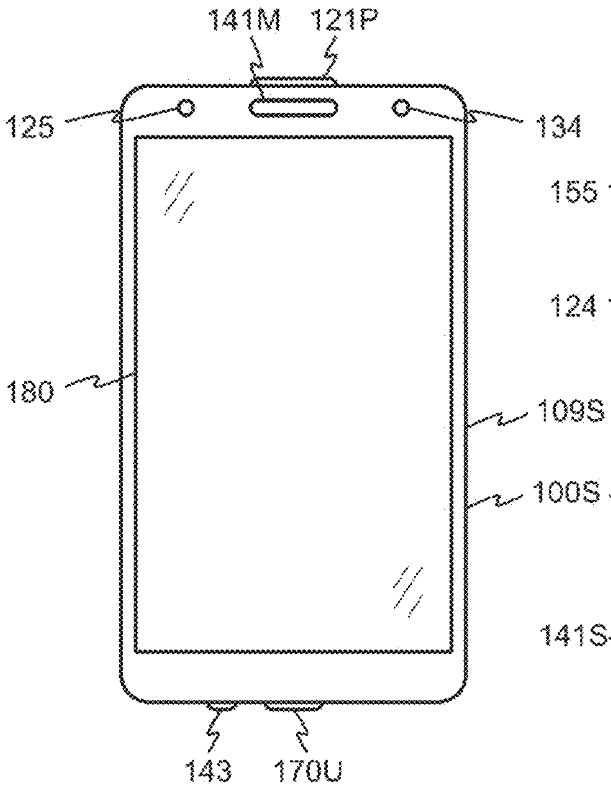
Figure 4B:
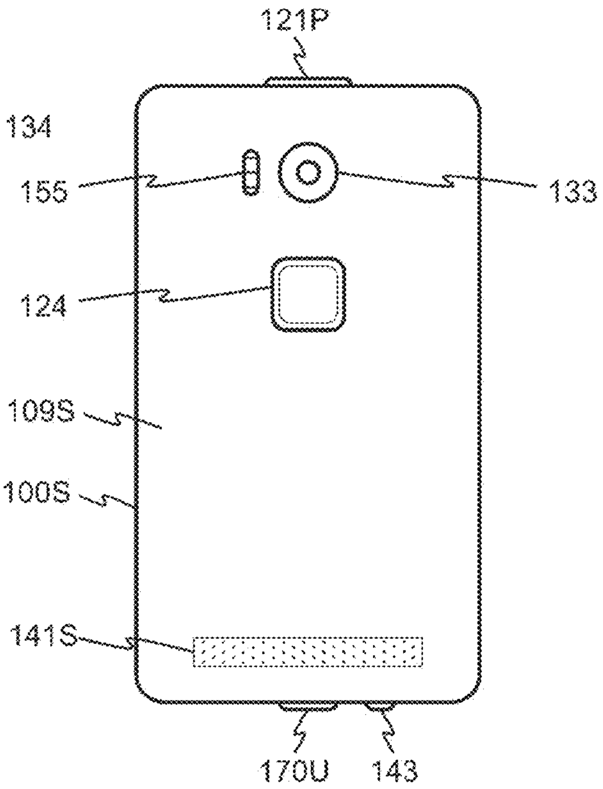

Each FIG. 4A and FIG. 4B illustrates an appearance of the information display device in the case where the information display device according to the first embodiment is a smartphone.

Figure 5:
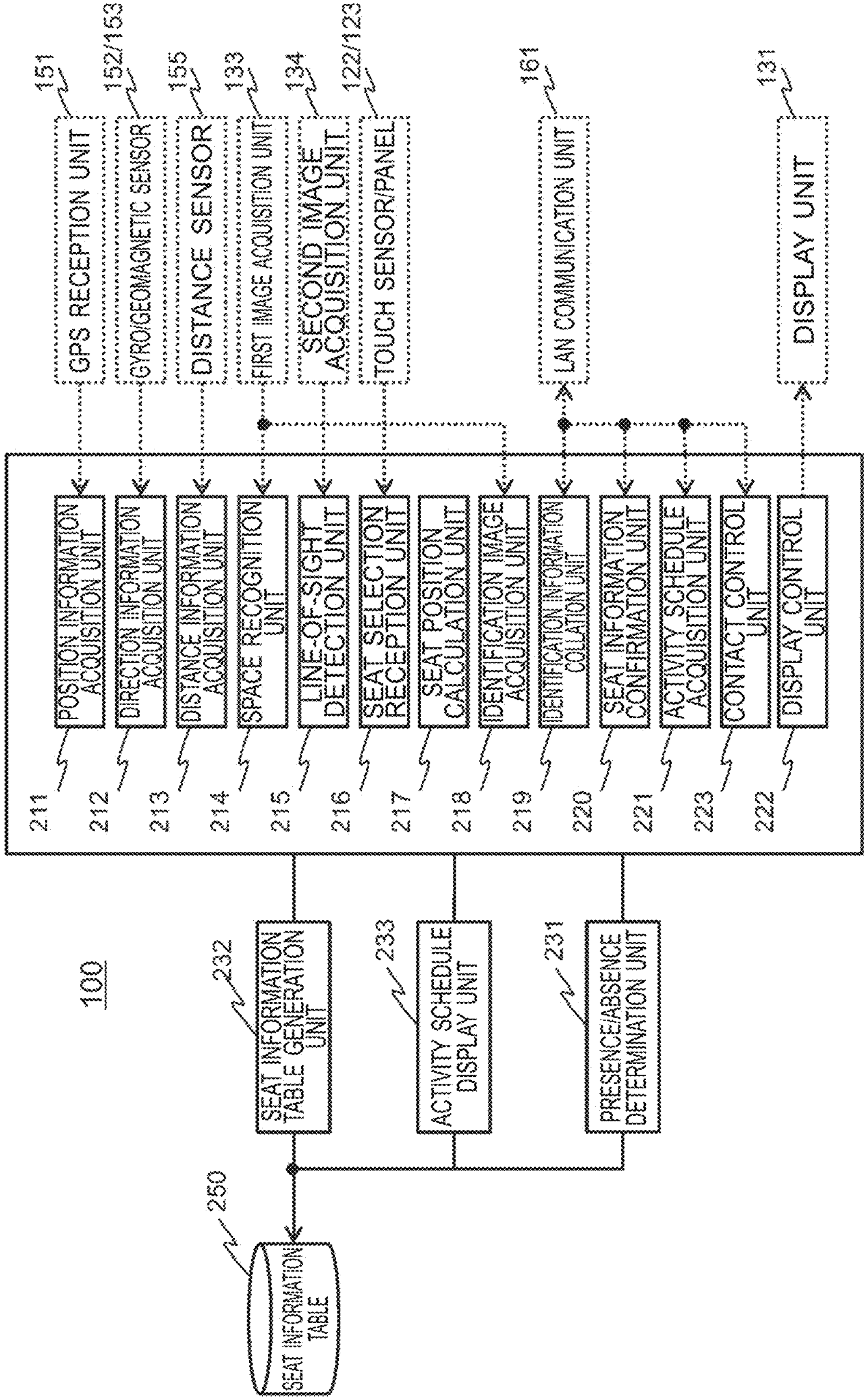

FIG. 5 illustrates a functional block of the information display device according to the first embodiment.

FIG. 6 explains an example of a seat information table according to the first embodiment.

Figure 7:
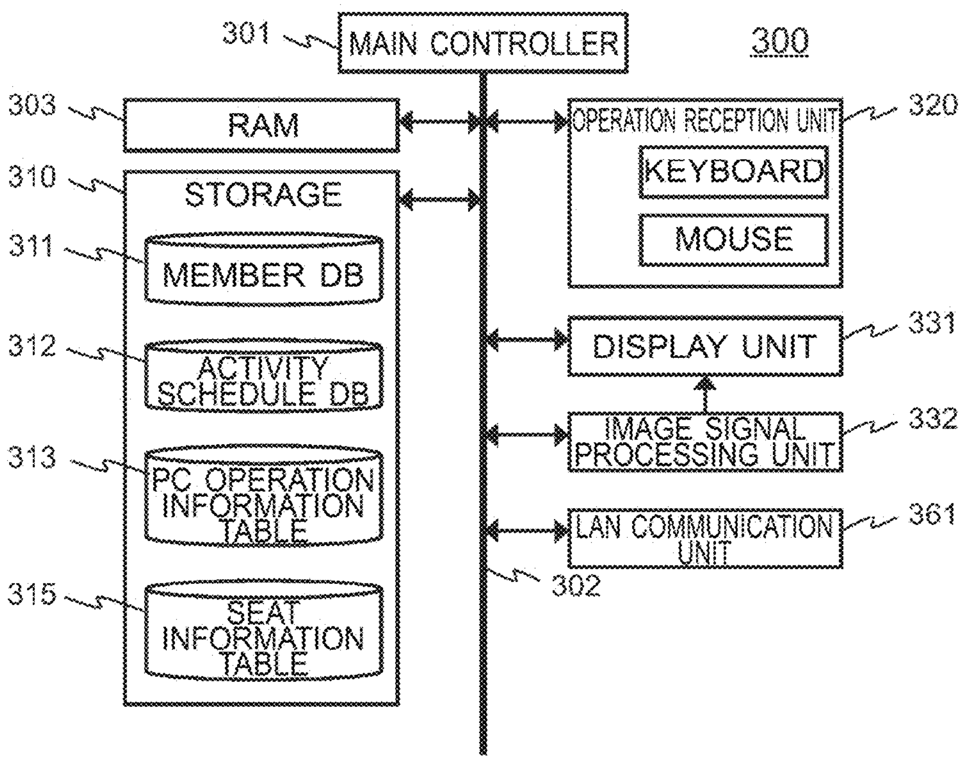

FIG. 7 illustrates a hardware configuration of a management server according to the first embodiment.

FIG. 8 explains an example of a member database according to the first embodiment.

FIG. 9 explains an example of an activity schedule database according to the first embodiment.

Figure 10A:
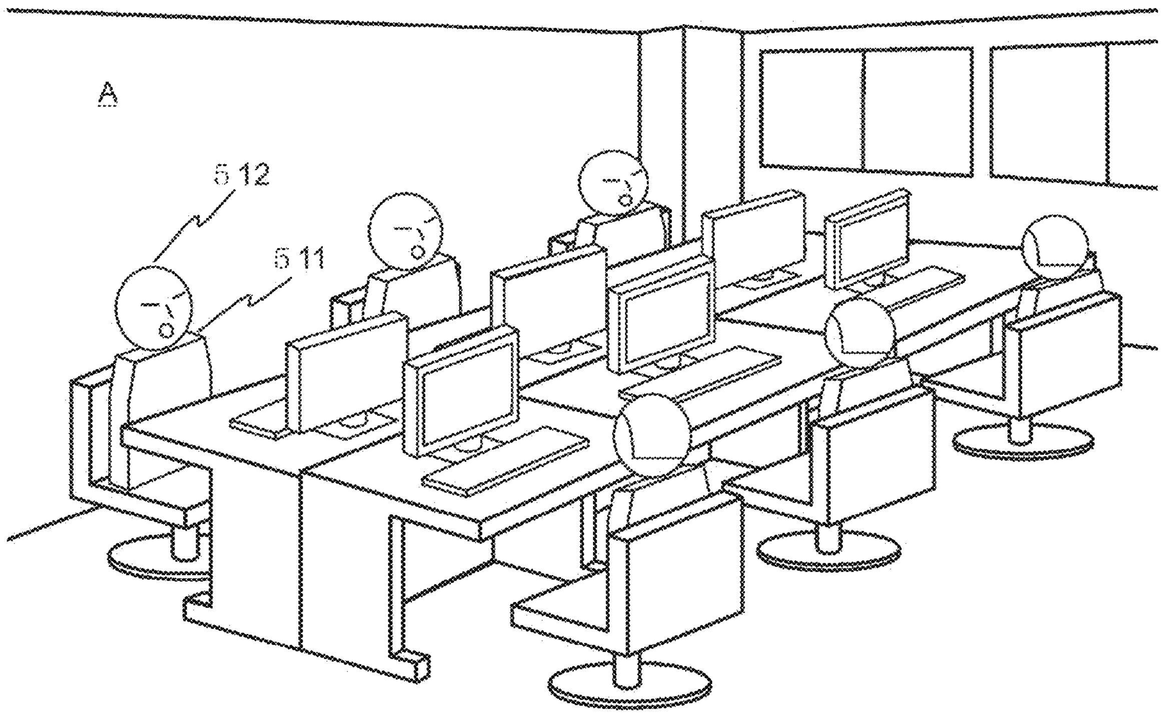
Figure 10B:
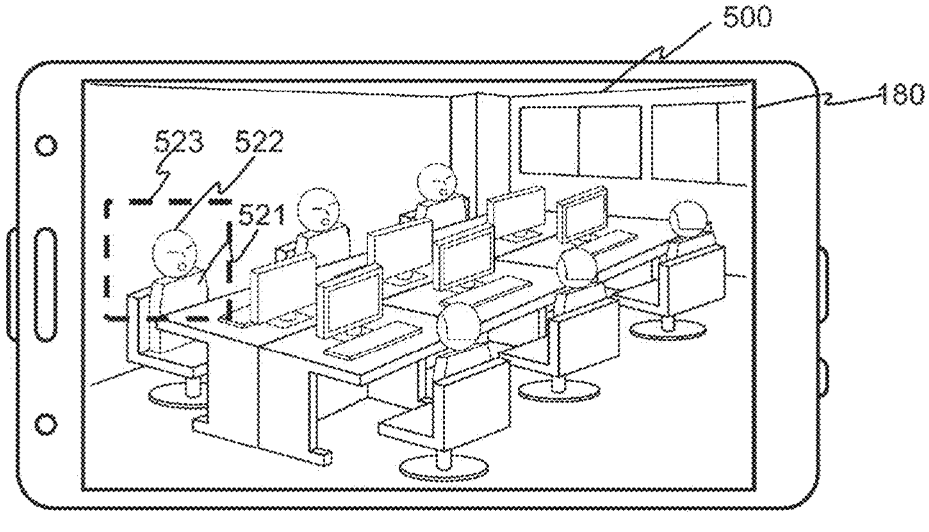

FIG. 10A explains an example of a room to be processed by seat information table generation processing according to the first embodiment, and FIG. 10B explains an example of an input image according to the first embodiment.

Figure 11:
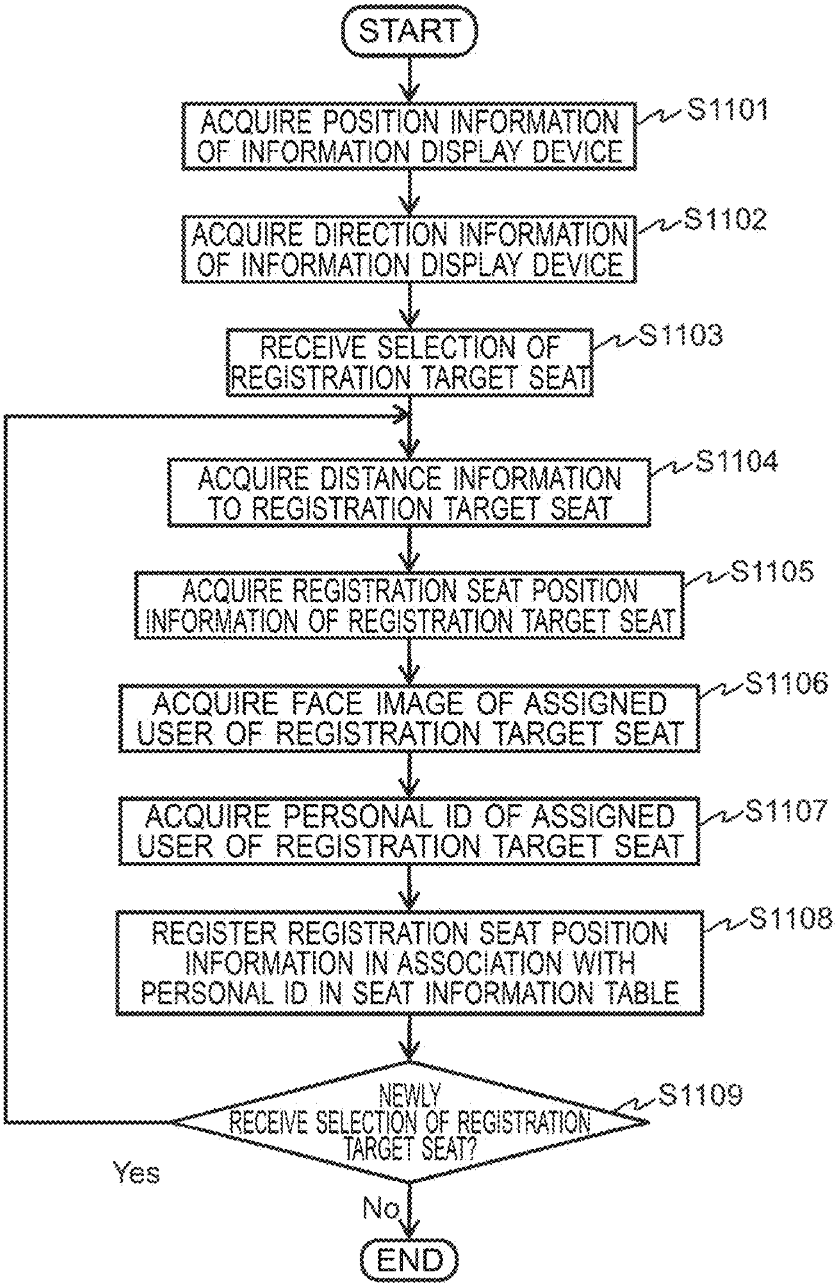

FIG. 11 illustrates a flowchart of the seat information table generation processing according to the first embodiment.

Figure 12A:
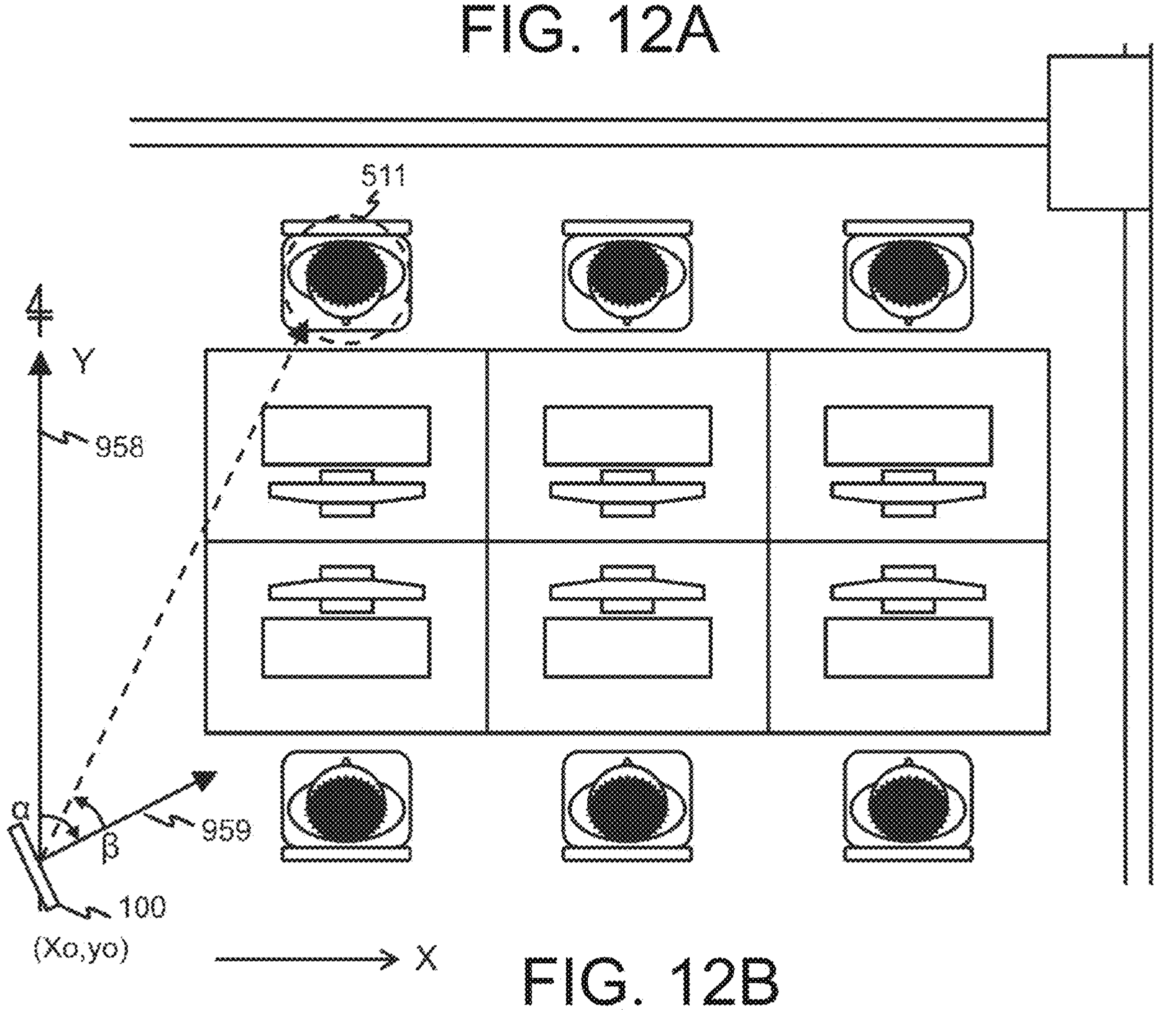
Figure 12B:
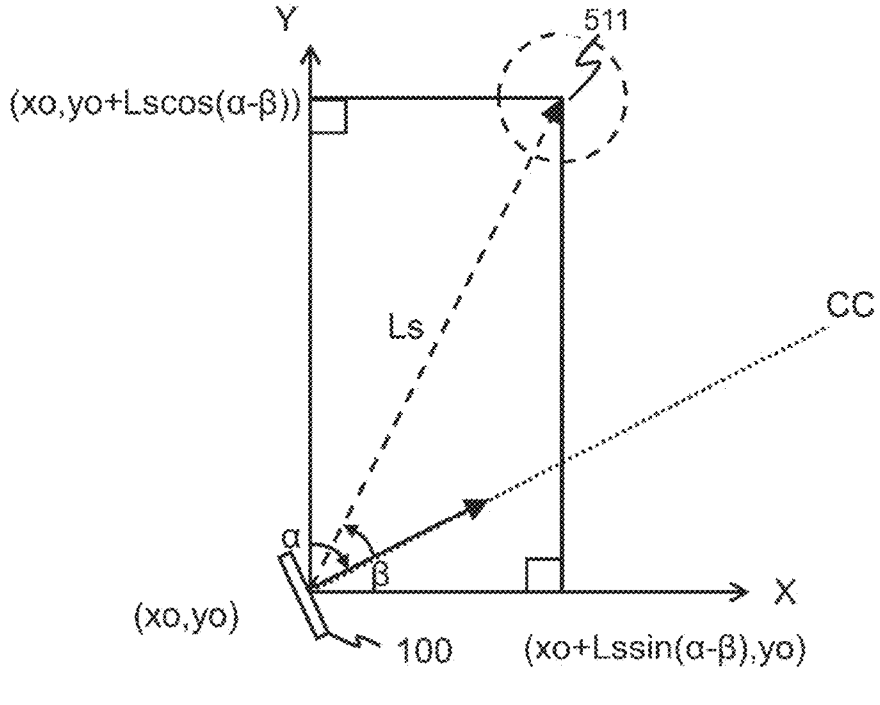

Each FIG. 12A and FIG. 12B explains a direction information acquisition procedure and position information calculation procedure according to the first embodiment.

Figure 13A:
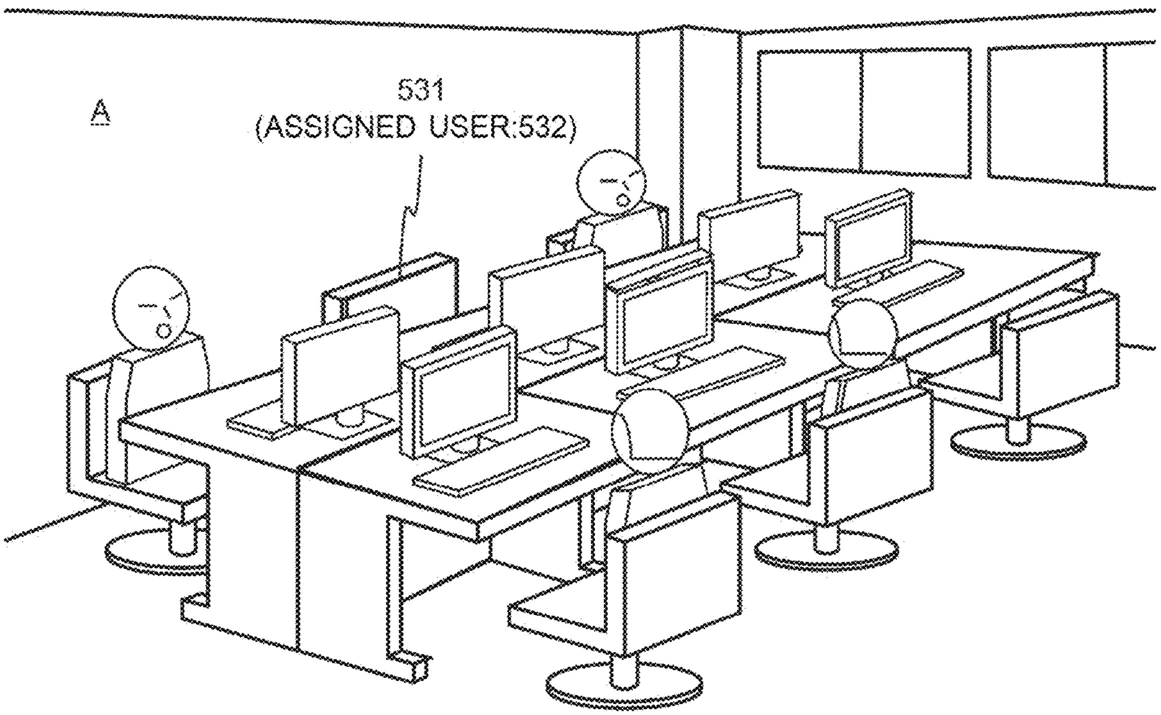
Figure 13B:
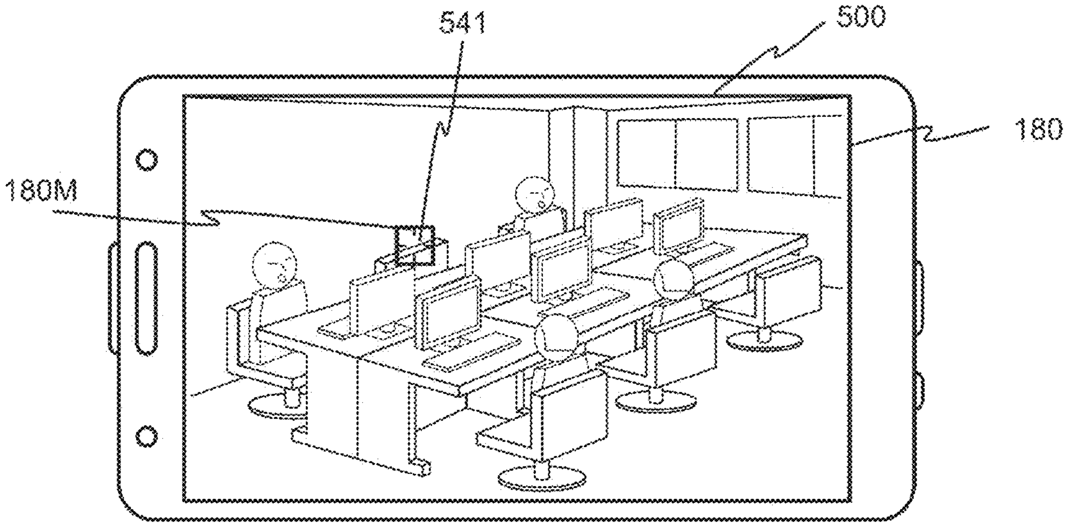

FIG. 13A explains an example of a room to be processed by activity schedule display processing according to the first embodiment, and FIG. 13B explains an example of an input image according to the first embodiment.

Figure 14:
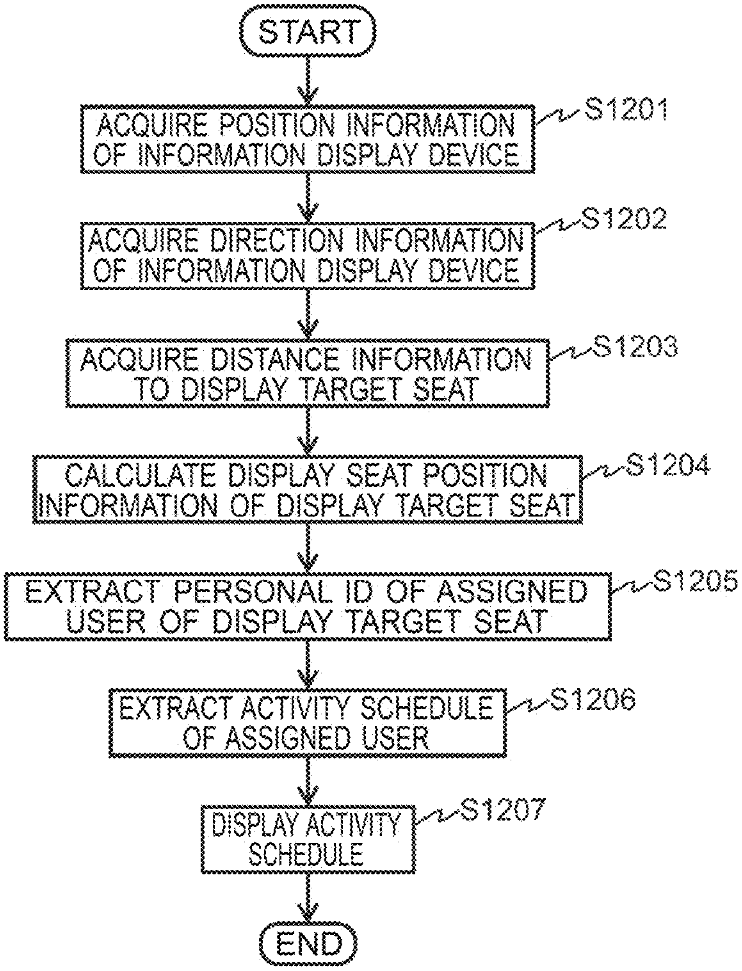

FIG. 14 illustrates a flowchart of the activity schedule display processing according to the first embodiment.

Figure 15:
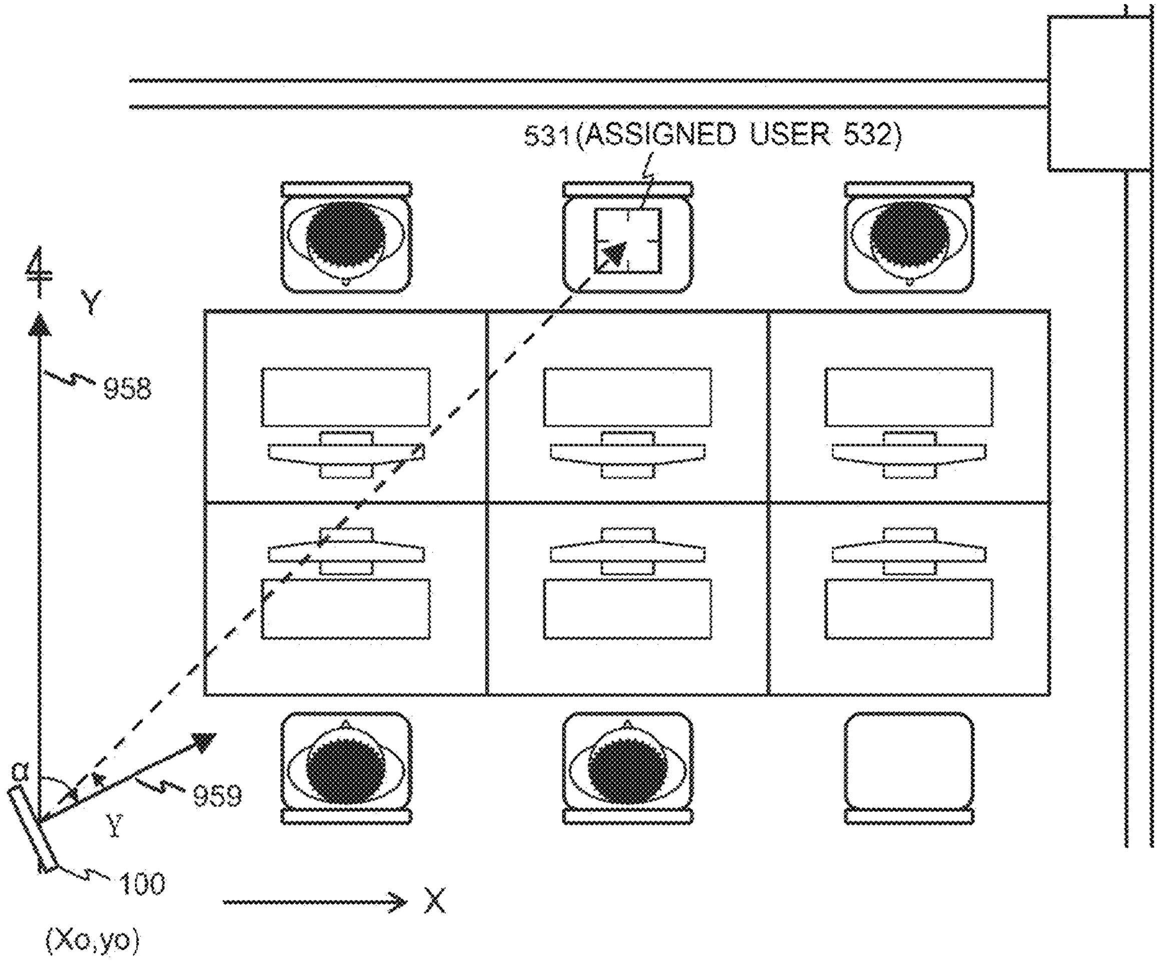

FIG. 15 explains a position information calculation procedure according to the first embodiment.

Figure 16A:
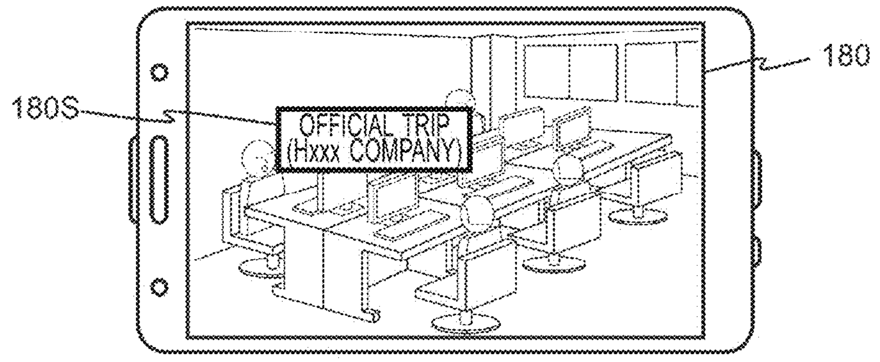
Figure 16B:
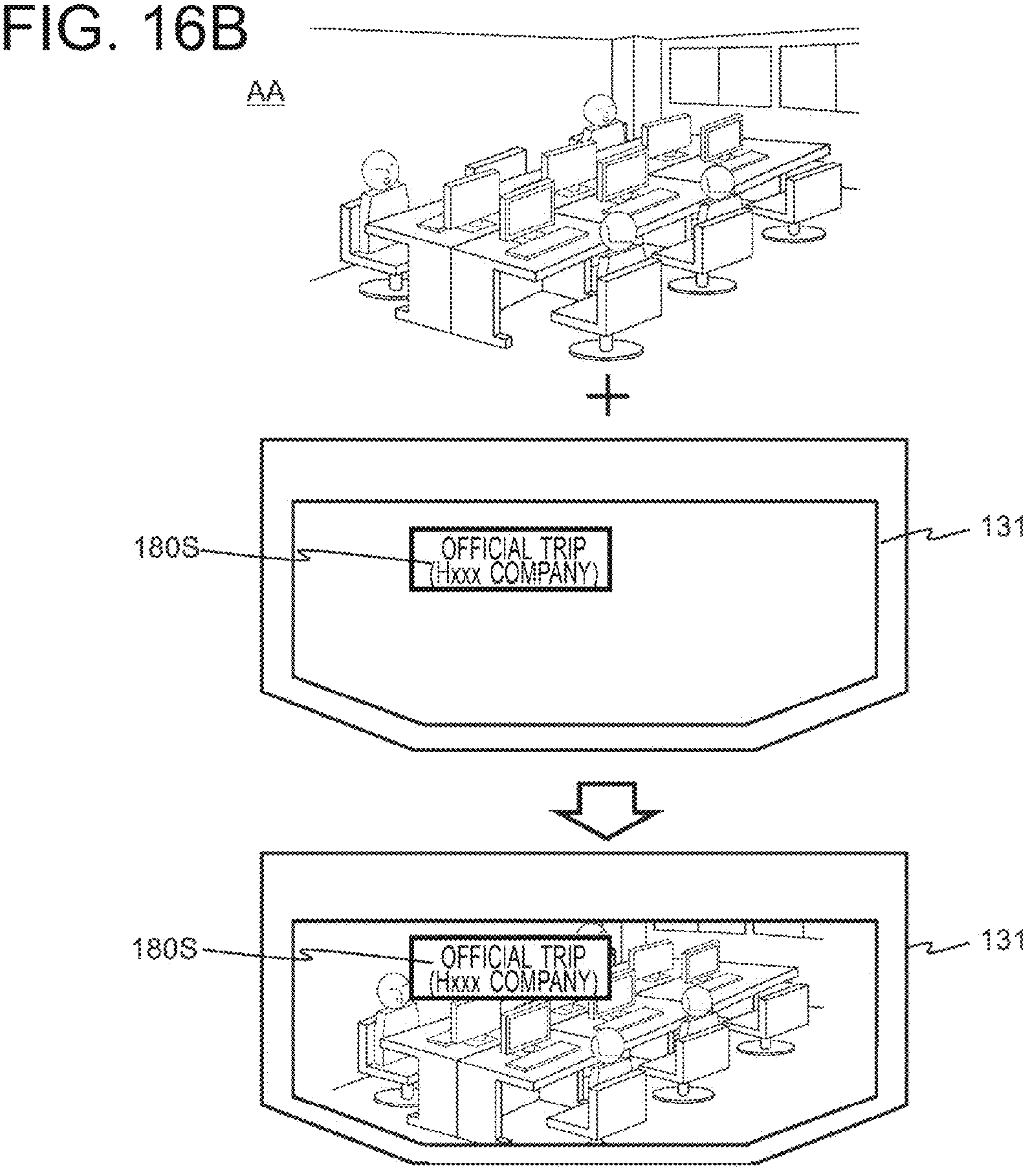

Each FIG. 16A and FIG. 16B explains an activity schedule display example according to the first embodiment.

Figure 17A:
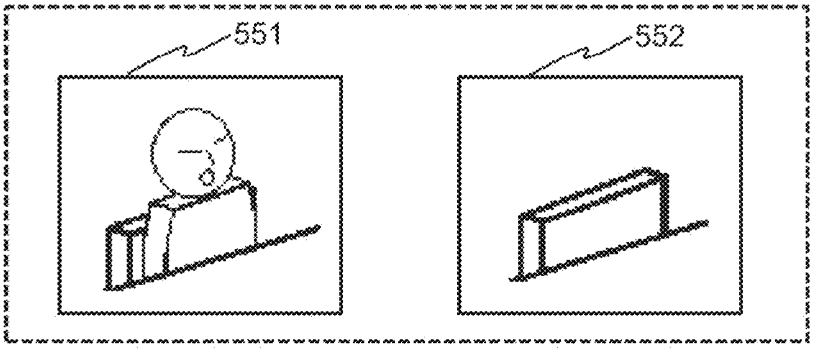
Figure 17B:
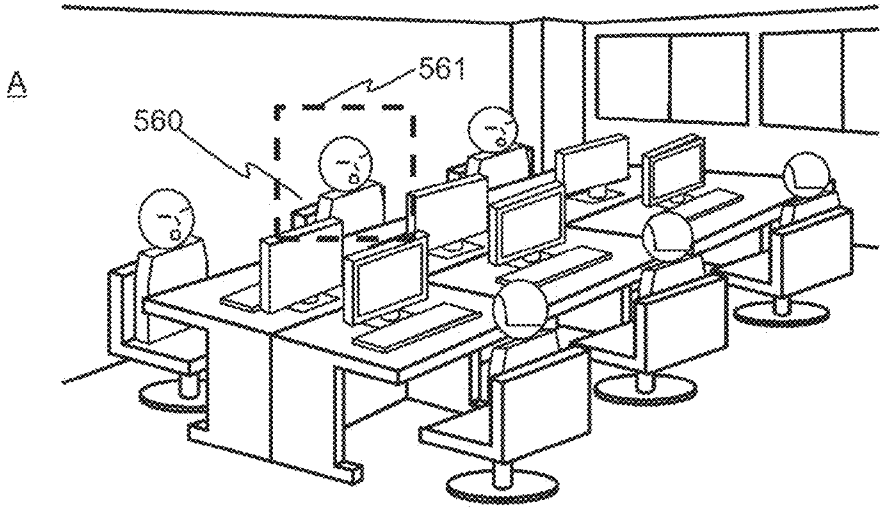
Figure 17C:
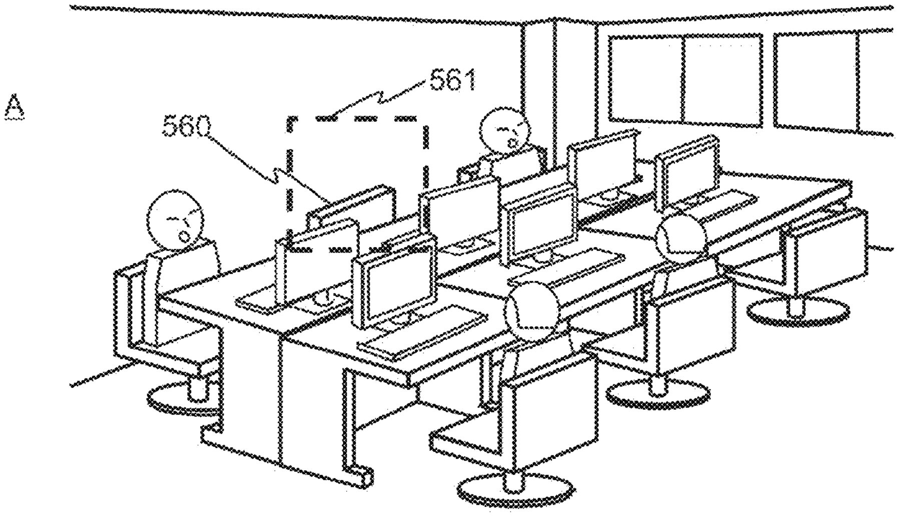

FIG. 17A explains an example of an image for collation according to a modification of the first embodiment, and each FIG. 17B and FIG. 17C explains an example of a real space according to a modification of the first embodiment.

Figure 18:
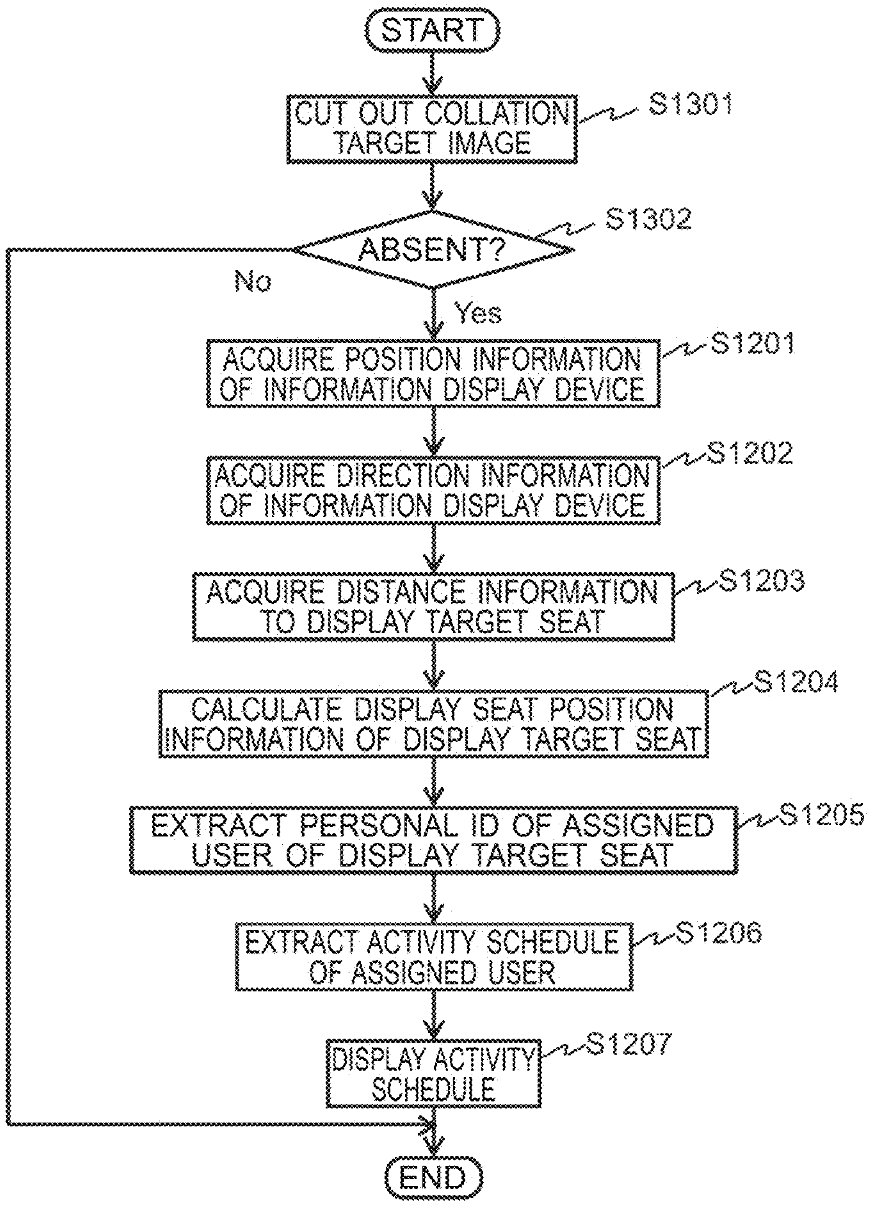

FIG. 18 illustrates a flowchart of activity schedule display processing according to a modification of the first embodiment.

Figure 19:
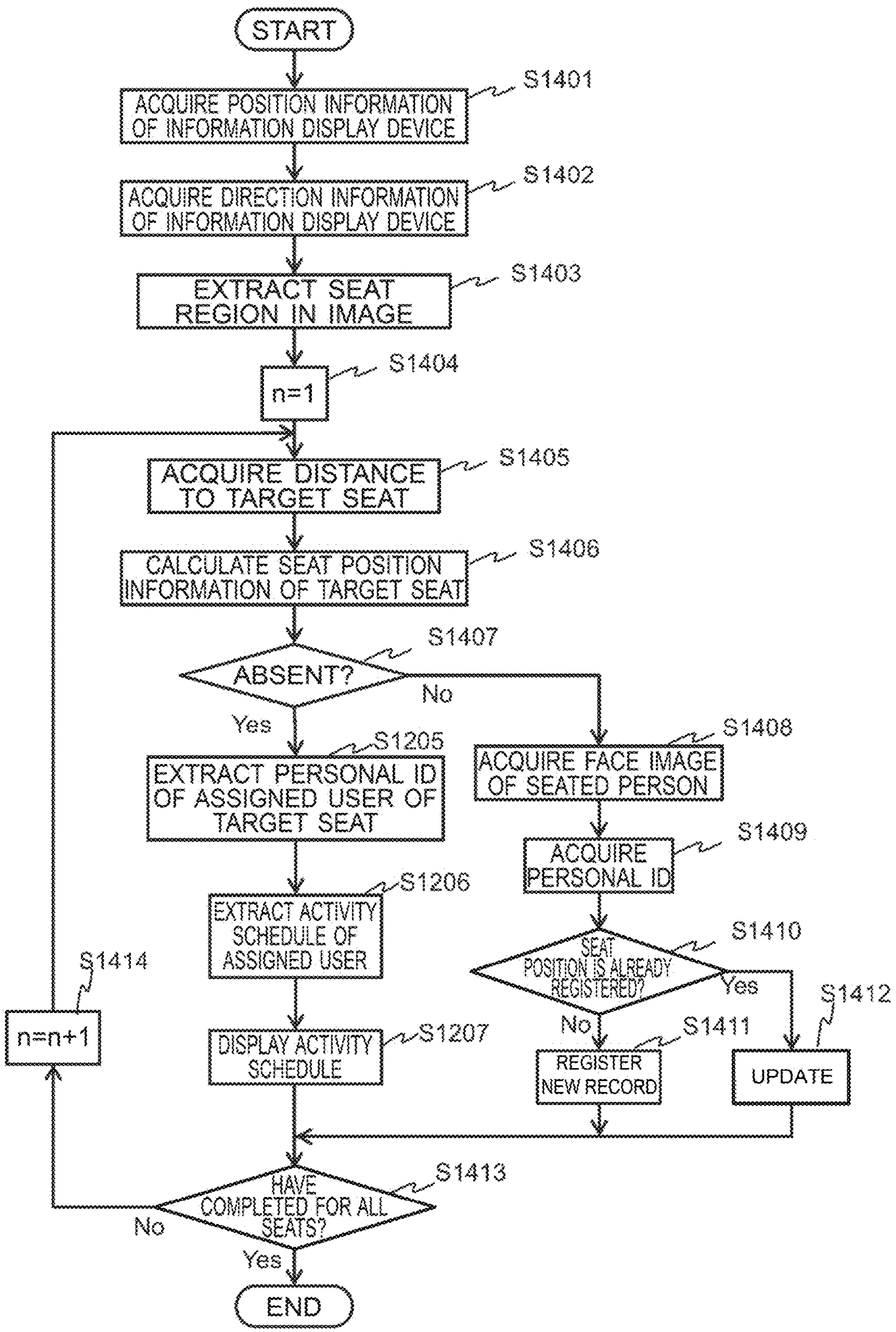

FIG. 19 illustrates a flowchart of processing of generating a seat information table and displaying an activity schedule according to a modification of the first embodiment.

Figure 20A:
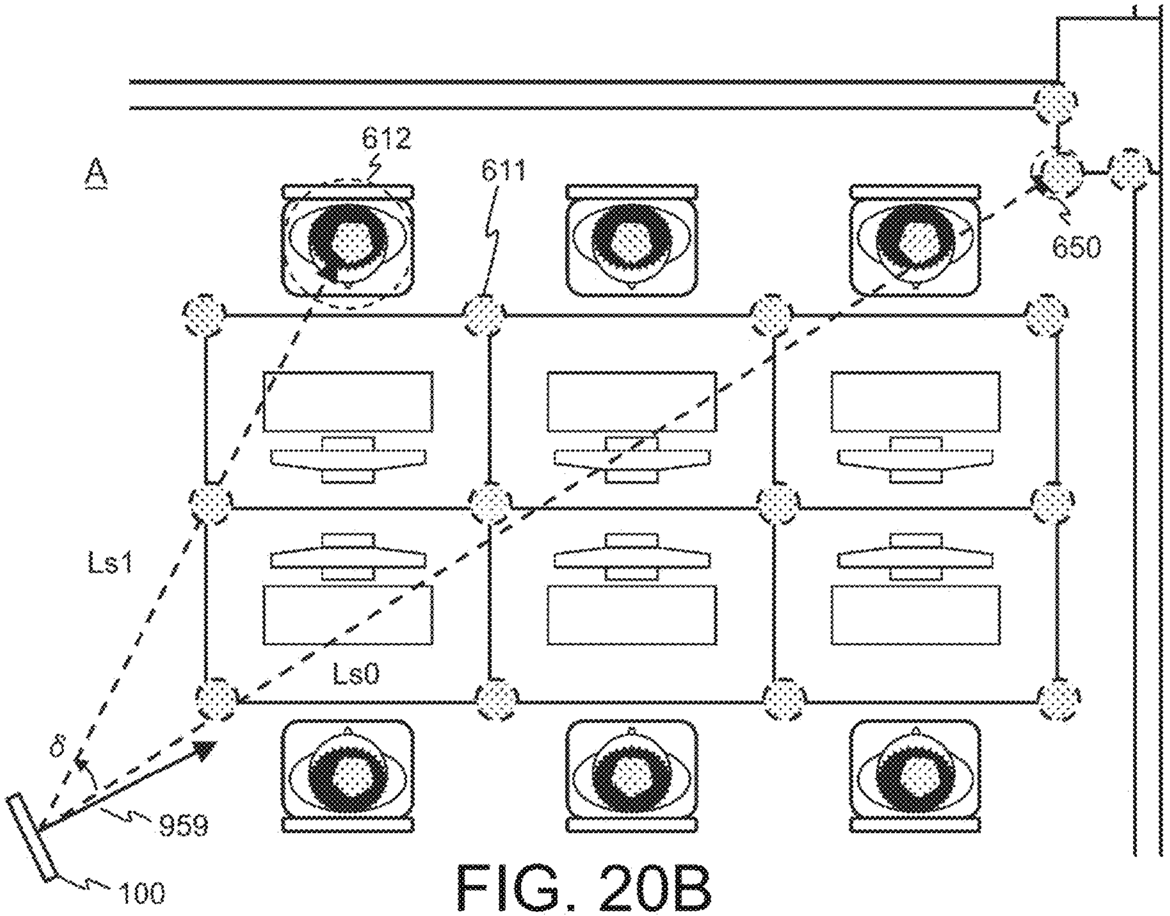
Figure 20B:
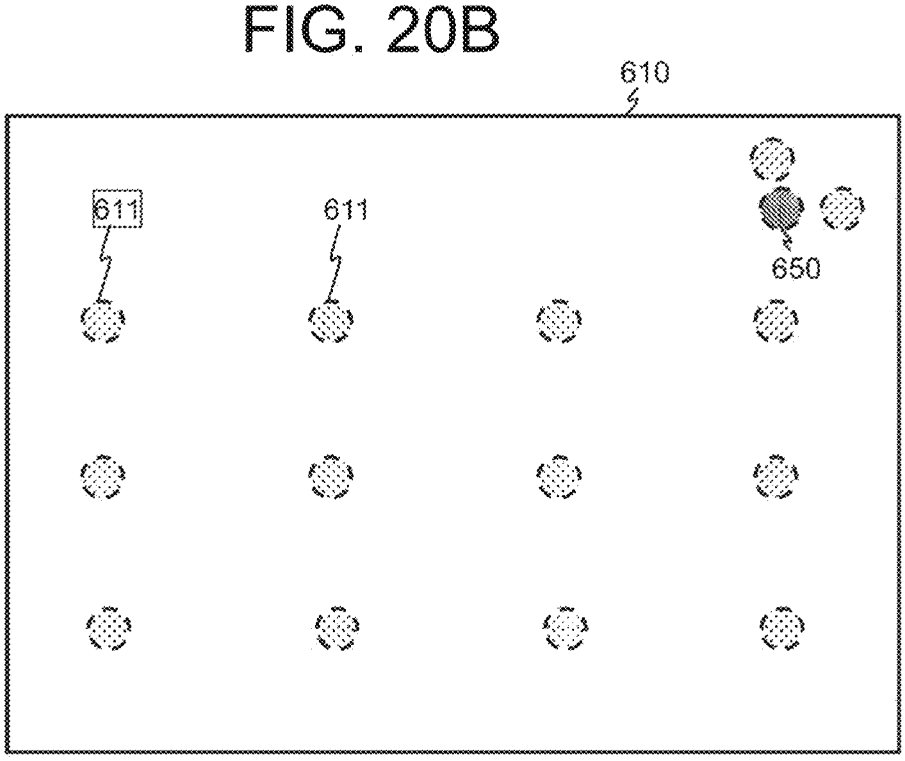

Each FIG. 20A and FIG. 20B explains a seat position information calculation procedure according to a modification of the first embodiment.

Figure 21:
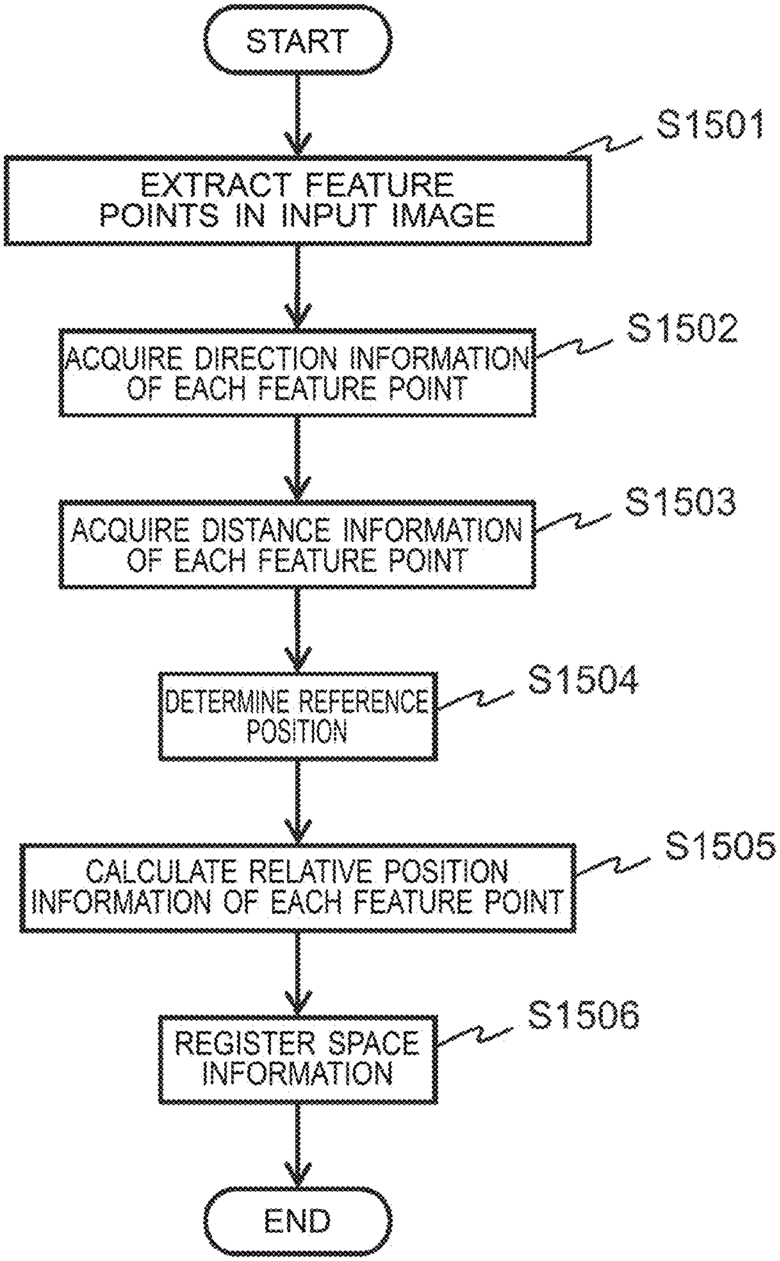

FIG. 21 illustrates a flowchart of space recognition processing according to a modification of the first embodiment.

Figure 22:
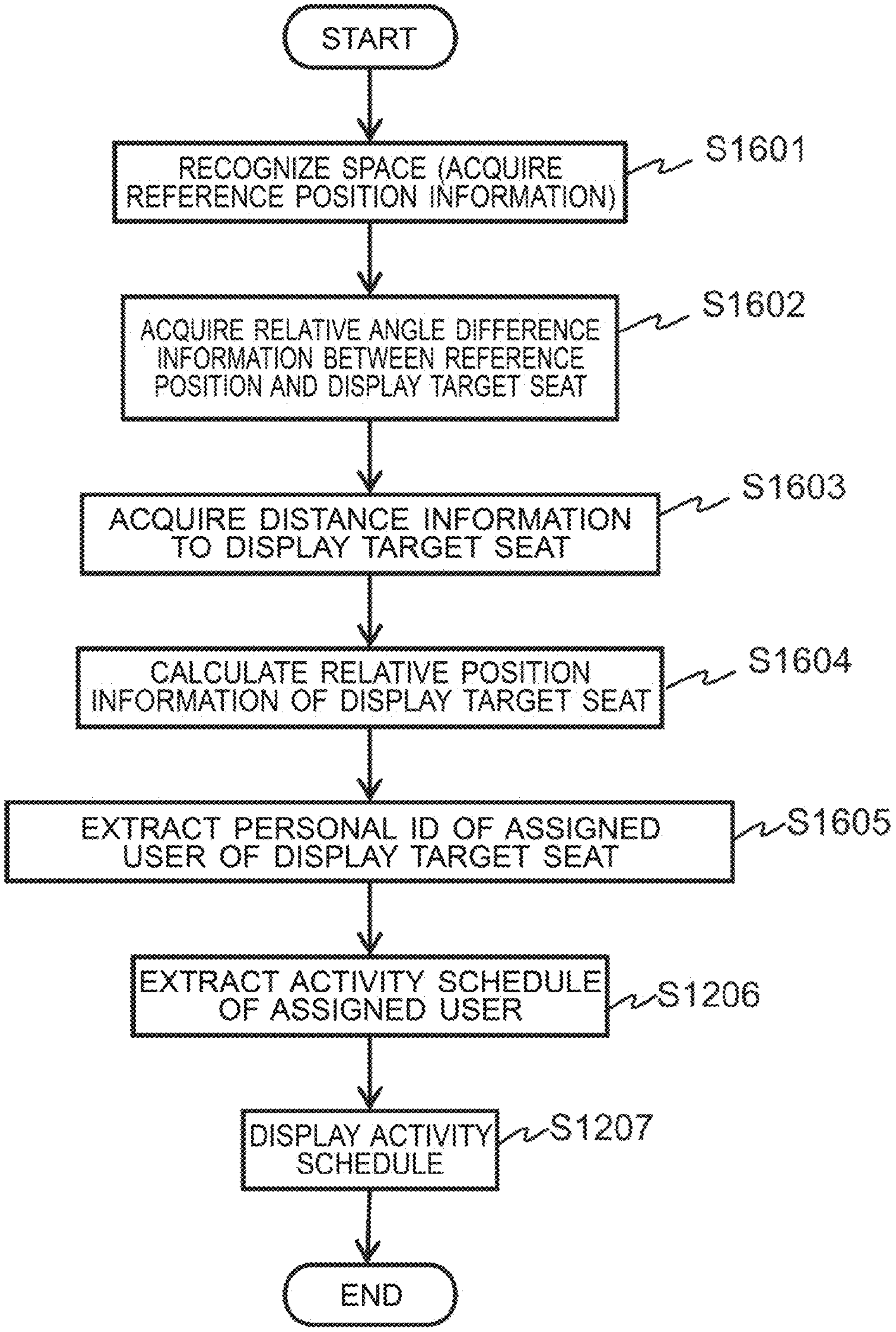

FIG. 22 illustrates a flowchart of activity schedule display processing according to a modification of the first embodiment.

Figure 23A:
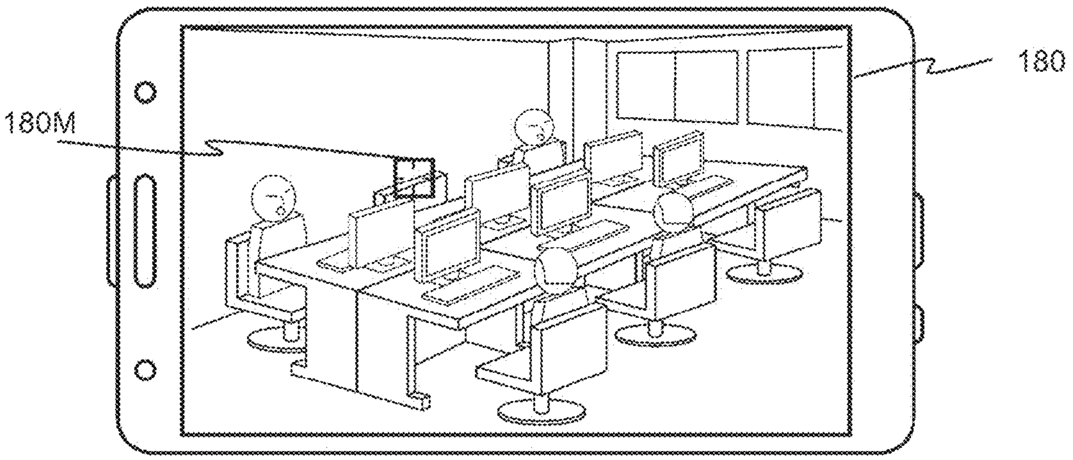
Figure 23B:
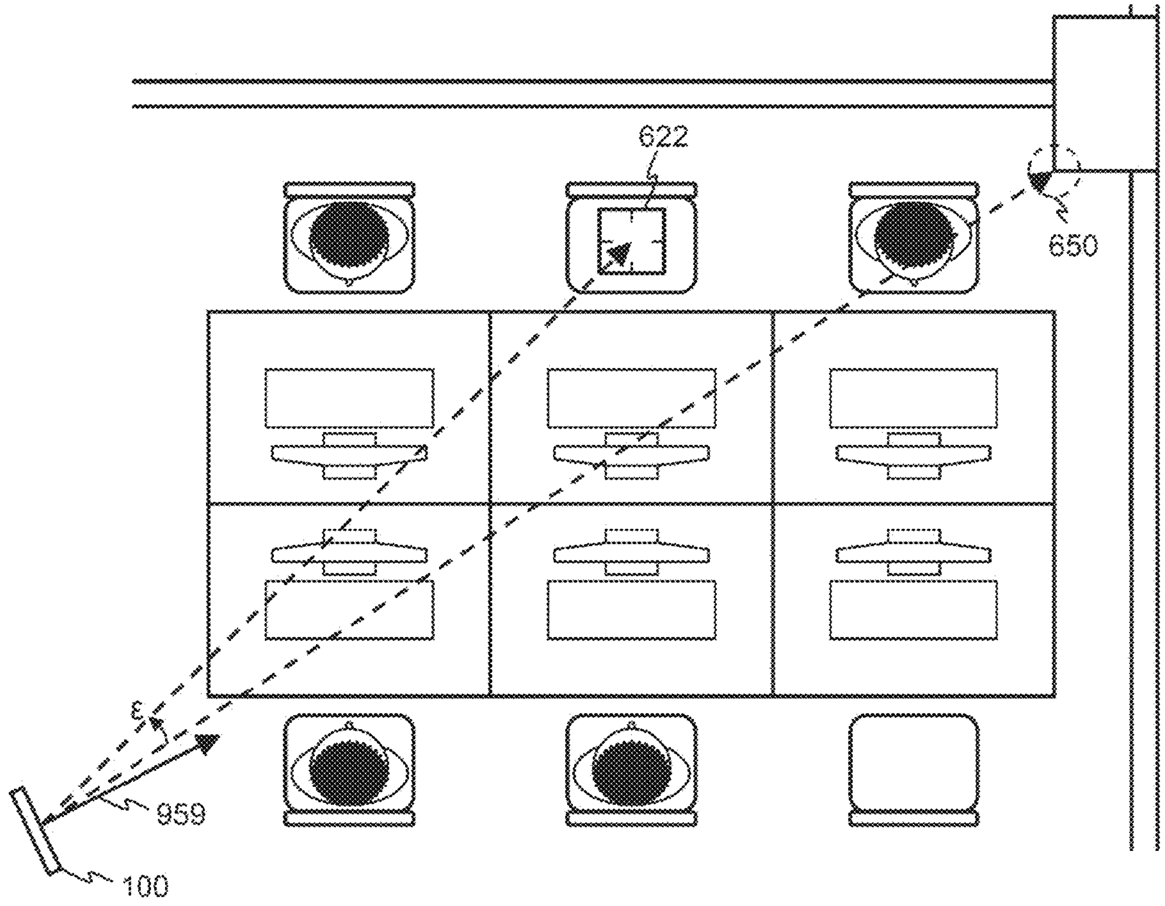

FIG. 23A explains an example of designation of an activity schedule display target seat according to a modification of the first embodiment, and FIG. 23B explains a calculation procedure of activity schedule display seat position information according to a modification of the first embodiment.

Each FIG. 24A to FIG. 24G explains an activity schedule display mode according to the first embodiment and modifications thereof.

FIG. 25 explains an example of a Personal Computer operation information table according to a modification of the first embodiment.

Figure 26:
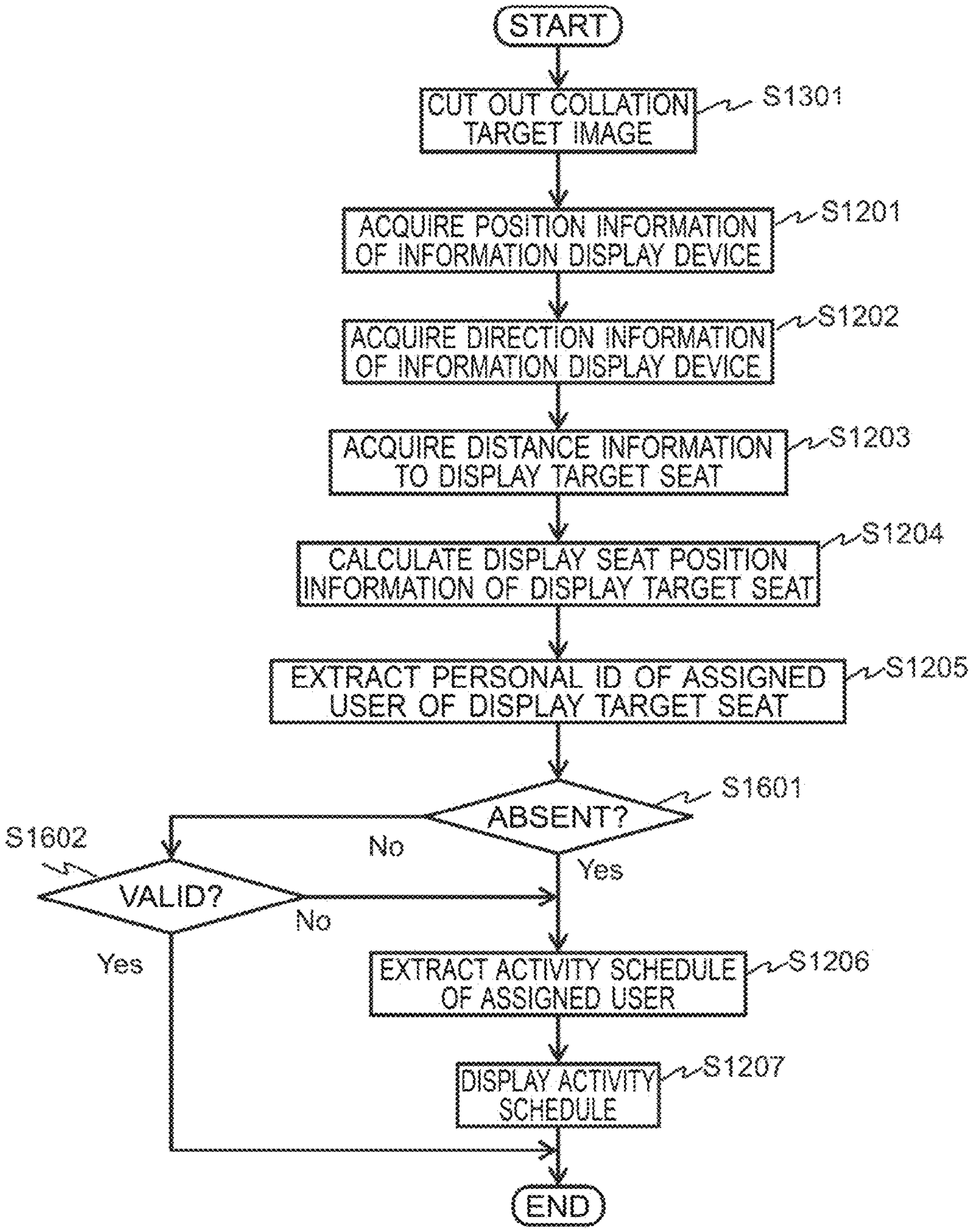

FIG. 26 illustrates a flowchart of activity schedule display processing according to a modification of the first embodiment.

Figure 27A:
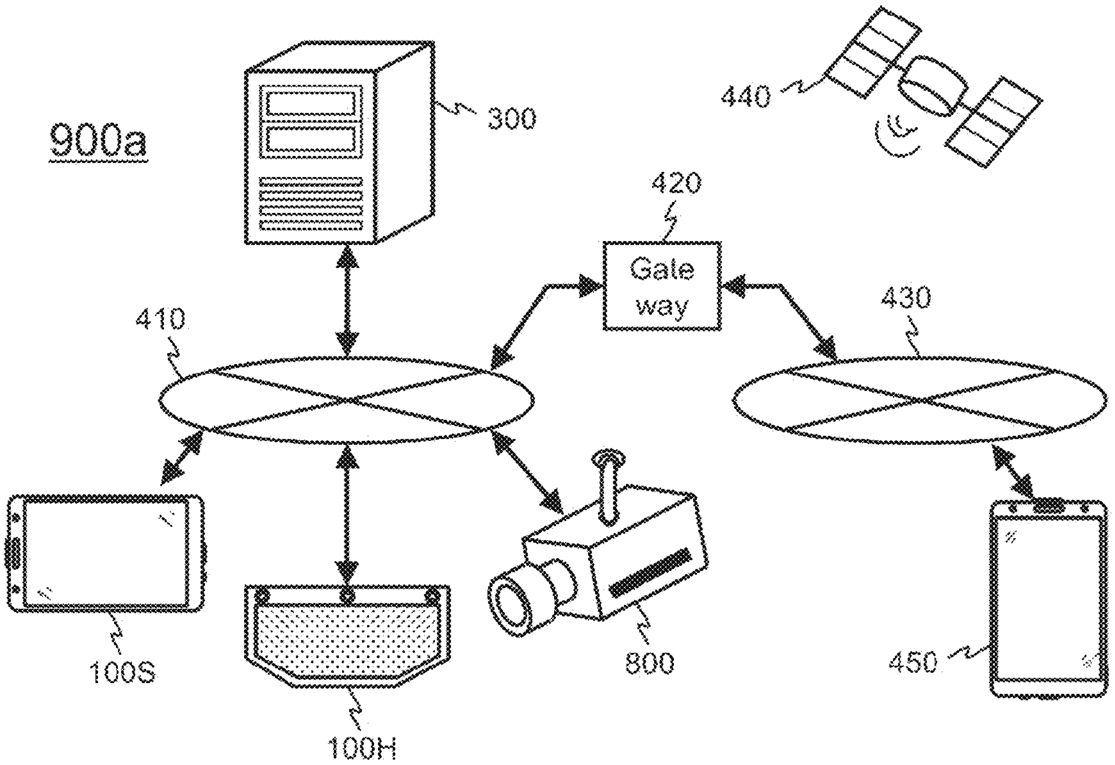
Figure 27B:
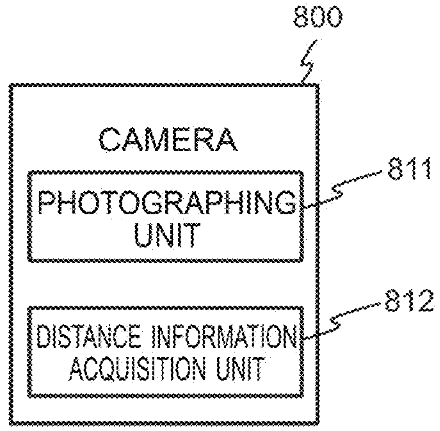

FIG. 27A illustrates a system configuration of an activity schedule display system according to a second embodiment, and FIG. 27B illustrates functional blocks of a camera according to the second embodiment.

FIG. 28 explains an example of a camera arrangement table according to the second embodiment.

Figure 29:
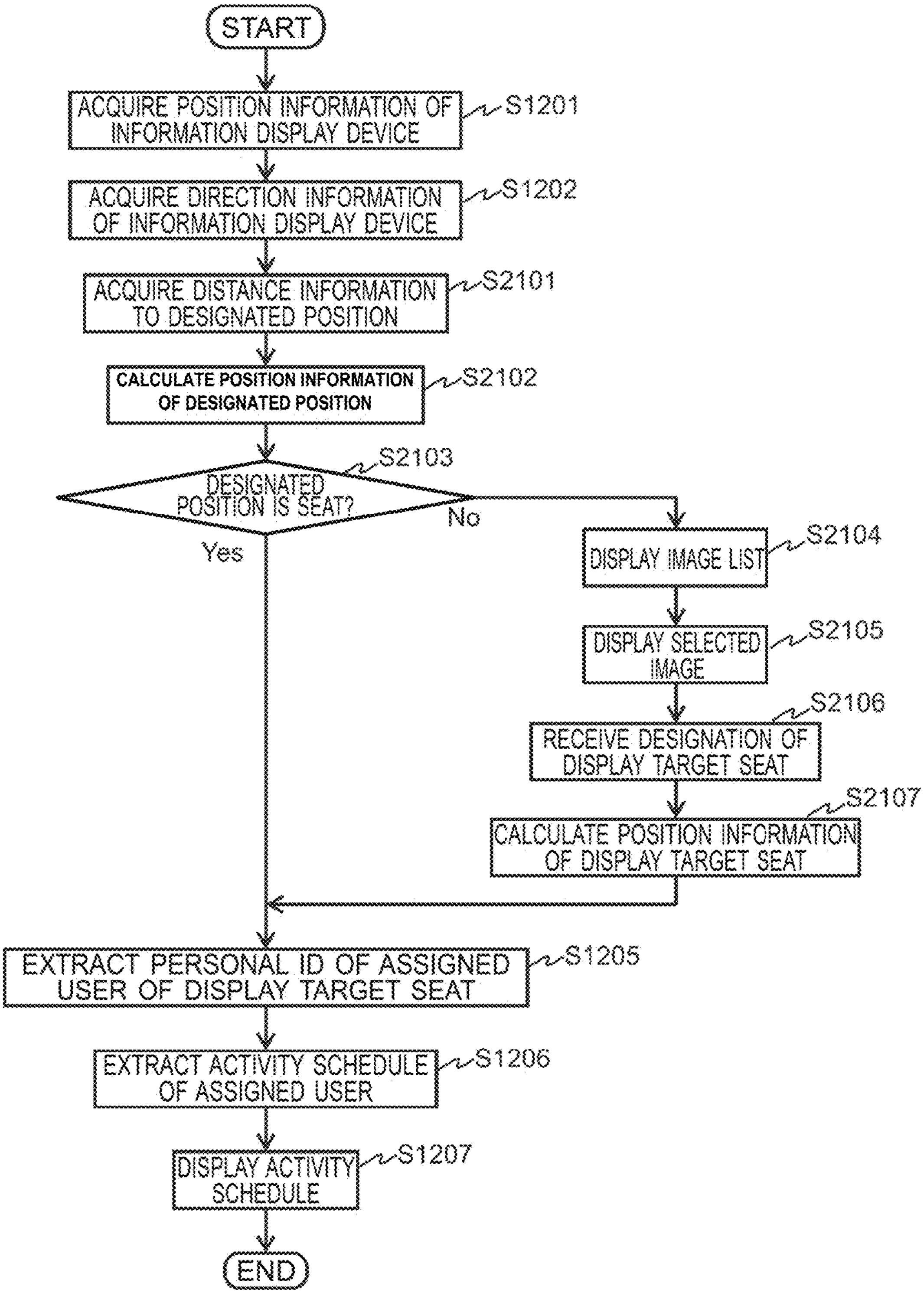

FIG. 29 illustrates a flowchart of activity schedule display processing according to the second embodiment.

Figure 30A:
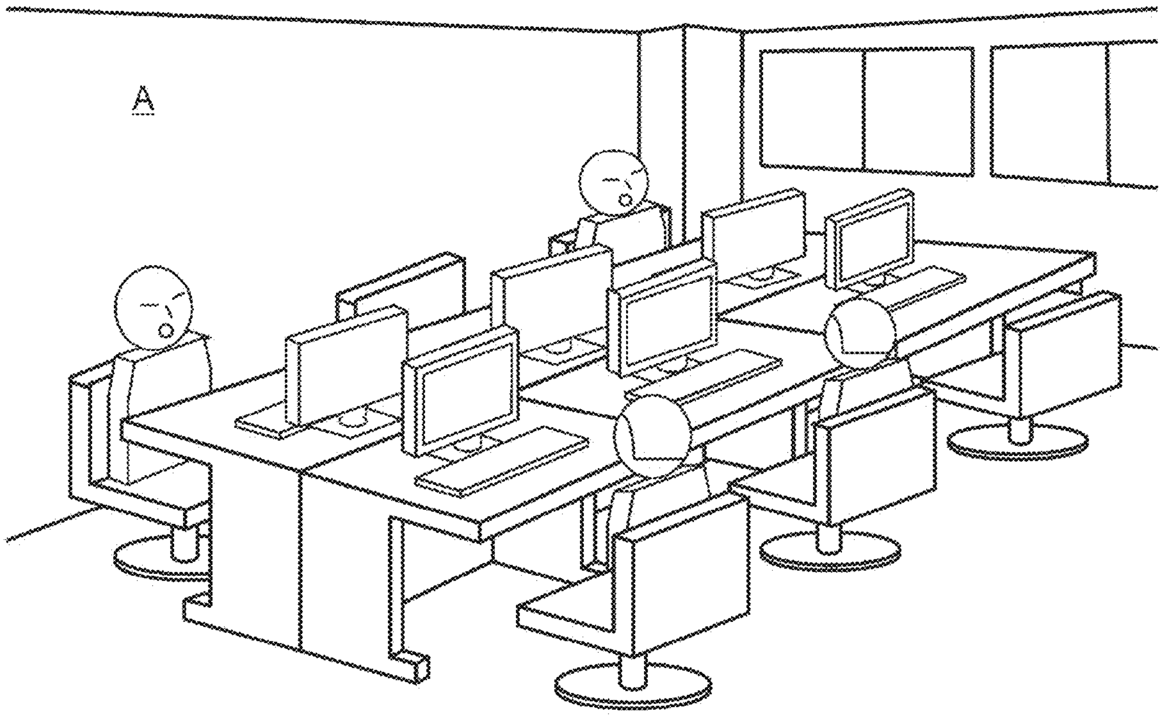
Figure 30B:
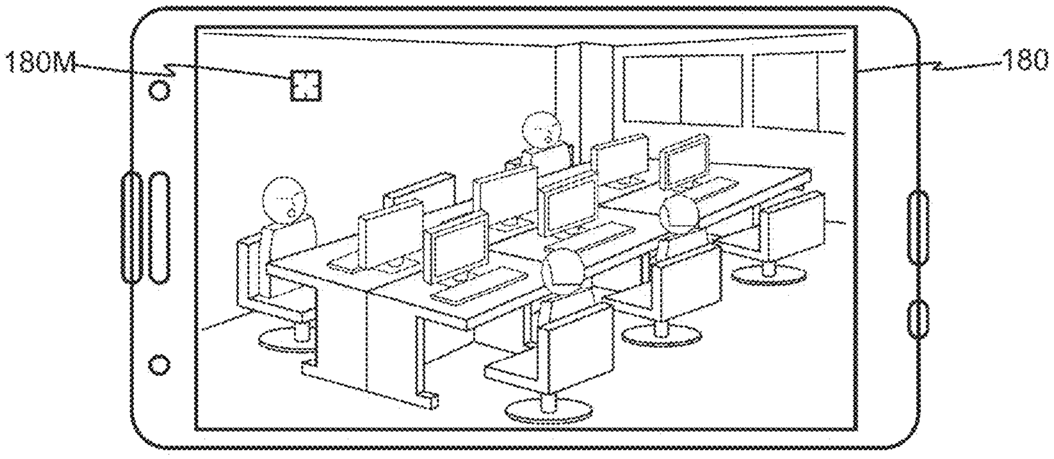

Each FIG. 30A and FIG. 30B explains a designation procedure of an activity schedule display target seat according to the second embodiment.

Figure 31A:
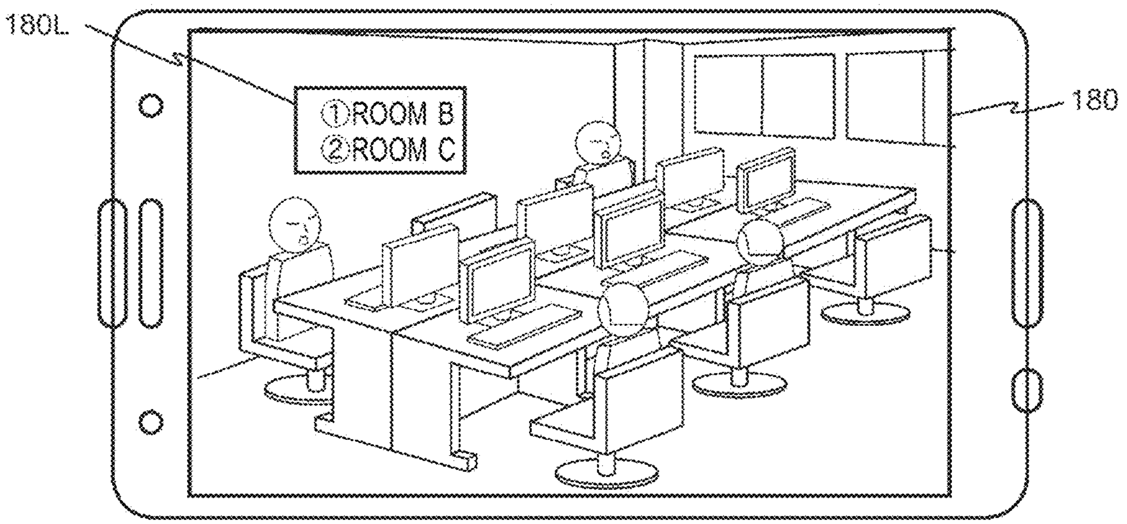
Figure 31B:
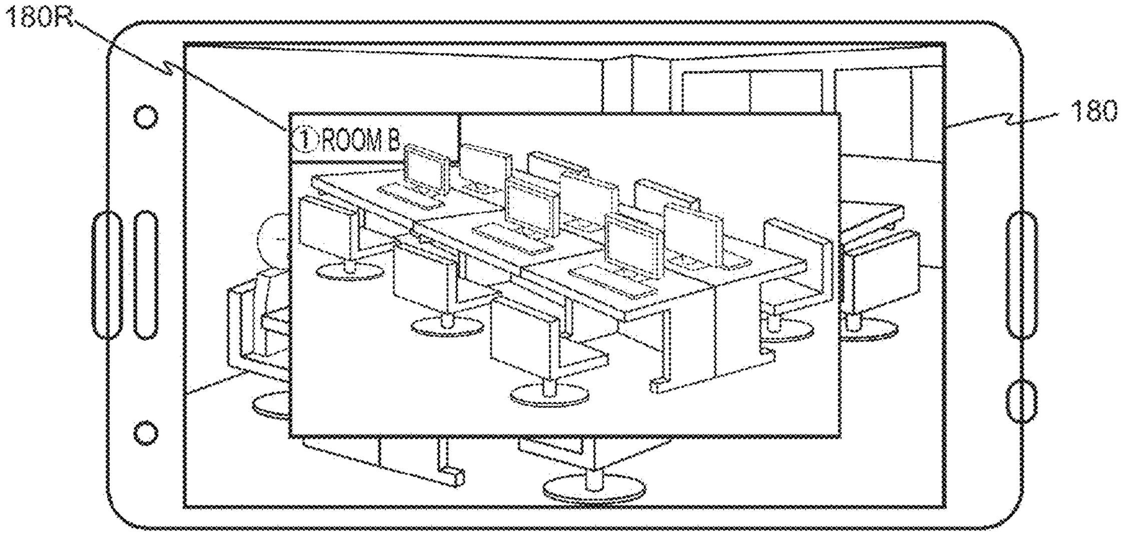

Each FIG. 31A and FIG. 31B explains a display example at the time of an activity schedule display target seat designation procedure according to the second embodiment.

DESCRIPTION OF EMBODIMENTS

First Embodiment

Hereinafter, a first embodiment of the present invention will be described with reference to the drawings. In the following, the same functions and the same processes will be provided with the same reference signs, respectively.

In the present embodiment, when a user (device user) who owns an information display device directs the information display device to a specific seat, if a person to be seated in the specific seat is absent, current information (and future information) of the absentee is automatically displayed on the information display device. The present embodiment works in an environment in which seats of persons (member) belonging to such as an office or a school are determined in advance.

[System Configuration]

Figure 1:
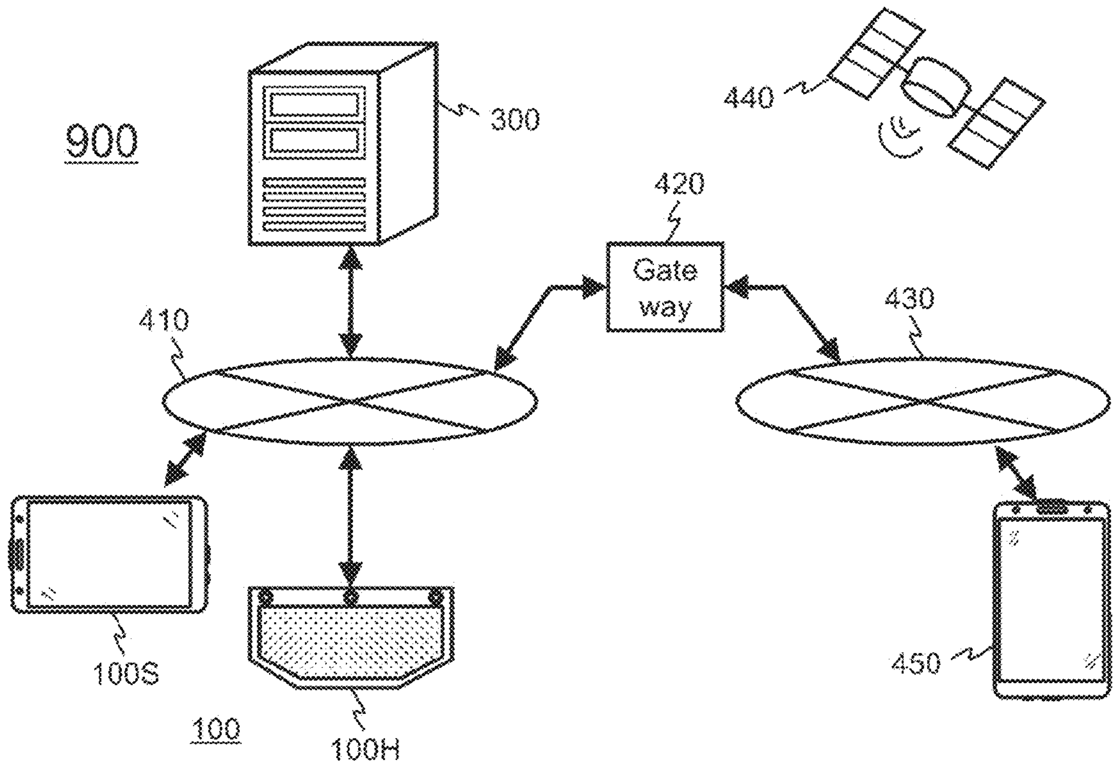
FIG. 1 illustrates a system configuration of an activity schedule display system according to a first embodiment.

FIG. 1 illustrates a system configuration of an activity schedule display system 900 according to the first embodiment. As illustrated in FIG. 1, the activity schedule display system 900 of the first embodiment includes an information display device 100 and a management server 300. The information display device 100 and the management server 300 are connected to each other via an internal network (LAN) 410.

The information display device 100 includes, for example, a head-mounted display (HMD) 100H and a smartphone 100S.

The information display device 100 of the first embodiment is configured to receive GPS information from a GPS satellite 440 to acquire its own position. Furthermore, the information display device 100 is connected to an external network 430 via a gateway device 420, which enables transmission and reception of data to and from other devices such as a mobile information terminal 450 that is connected to the information display device 100 via the external network 430. Furthermore, the information display device 100 itself may be configured to transmit and receive information to and from the management server 300 via the external network 430, the gateway device 420, and the internal network 410.

Hereinafter, the information display device 100 and the management server 300 will be described in detail.

[Information Display Device]

The information display device 100 of the first embodiment is a mobile information processing device including a GPS reception function, a direction detection function, a distance measurement function, an image acquisition function, and a display function. As described above, the information display device 100 is, for example, the HMD 100H or the smartphone 100S. A display unit for implementing the display function can display such as a transmission type AR and a camera through AR.

[Hardware Configuration of Information Display Device]

Figure 2:
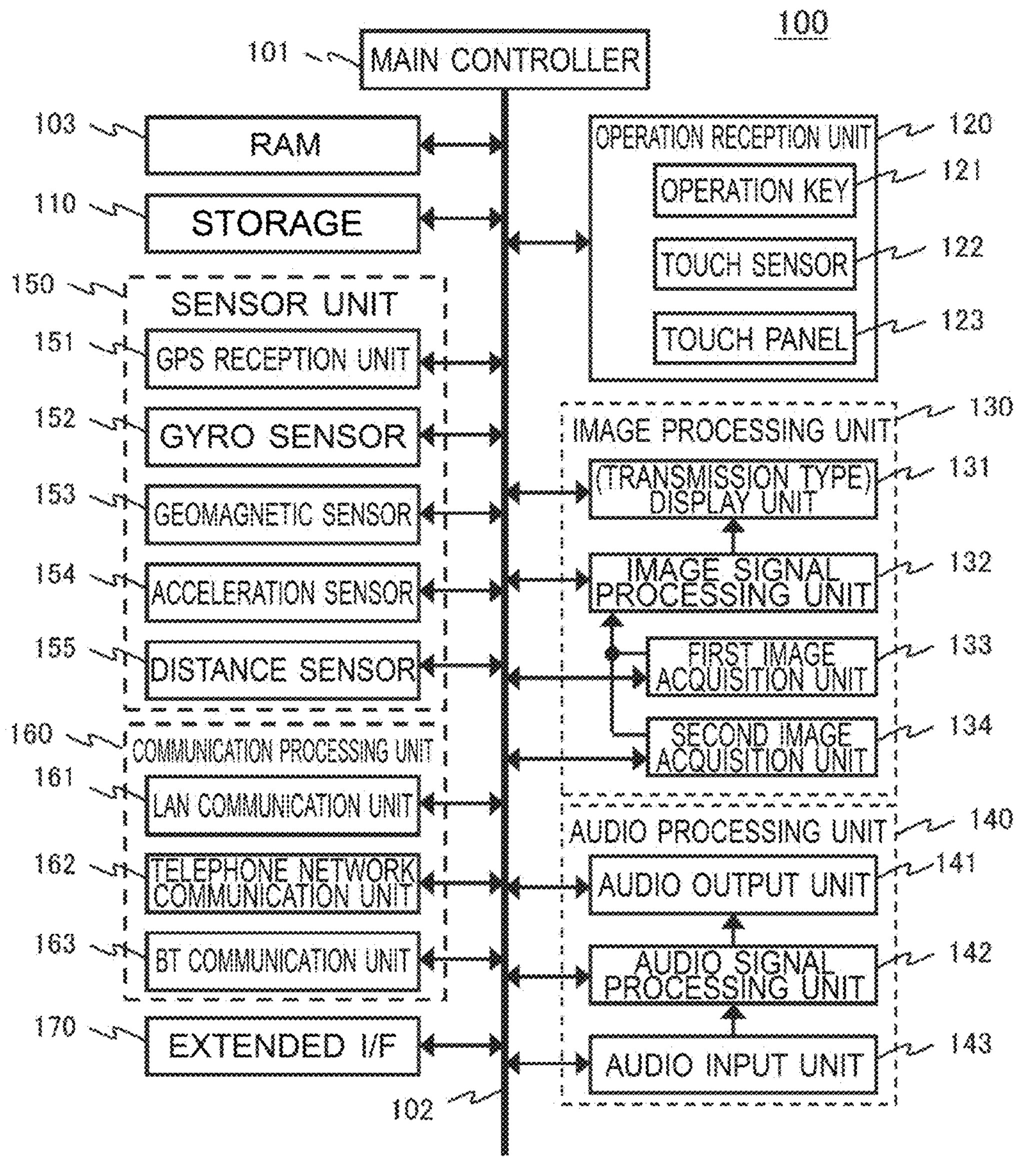
FIG. 2 illustrates a hardware configuration of an information display device according to the first embodiment.

FIG. 2 illustrates a hardware configuration of the information display device 100 of the first embodiment. As illustrated in FIG. 2, the information display device 100 of the first embodiment includes a main controller 101, a system bus 102, a RAM 103, a storage 110, an operation reception unit 120, an image processing unit 130, an audio processing unit 140, a sensor unit 150, a communication processing unit 160, and an extended interface (I/F) 170.

The main controller 101 is a central processor unit CPU or a microprocessor unit (MPU) for controlling the entire information display device 100 in accordance with predetermined programs.

The system bus 102 is a data communication path for transmitting and receiving data between the main controller 101 and each unit in the information display device 100.

The RAM 103 is a program area during execution of a basic operation program or other application programs. Furthermore, the RAM 103 is a temporary storage area for temporarily holding data as necessary during execution of various application programs. The RAM 103 may be integrated with the main controller 101.

The storage 110 is configured to store, for example, various operation setting values of the information display device 100, and information of a user of the information display device 100. In addition, the storage 110 may store, for example, still image data and moving image data captured by the information display device 100. Here, it is assumed that the information display device 100 can extend functions by downloading new application programs from an application server via the Internet. At this time, the storage 110 stores the downloaded new application programs. The main controller 101 loads and executes the new application programs stored in the storage 110 onto the RAM 103 so that the information display device 100 can obtain the various functions.

The storage 110 needs to hold stored information even in a state where the information display device 100 is not supplied with power. Accordingly, as the storage 110, a device such as a flash ROM, a Solid State Drive (SSD), or a Hard Disc Drive (HDD) is used.

The operation reception unit 120 is configured to receive an operation instruction that has been input to the information display device 100. In the first embodiment, the operation reception unit 120 includes an operation key 121 having such as a power key, a volume key, and a home key. In the case where the information display device 100 is the HMD 100H, the operation reception unit 120 includes a touch sensor 122 for receiving an operation instruction via a touch pad. In the case where the information display device 100 is the smartphone 100S, the operation reception unit 120 includes a touch panel 123 arranged so as to be superimposed on a display unit 131.

In the case of the smartphone 100S, an input of an instruction may be received via such as a keyboard connected to the extended interface unit 170, which will be described later. Furthermore, an operation of the information display device 100 may be received via a separate information processing terminal connected to the information display device 100 via wired communication or wireless communication.

The image processing unit 130 is an image (video) processor, and includes the display unit 131, an image signal processing unit 132, a first image acquisition unit 133, and a second image acquisition unit 134.

The display unit 131 is, for example, a display device (display) such as a liquid crystal panel, and configured to present the image data processed by the image signal processing unit 132, which will be described later, to the user of the information display device 100. In the case where the information display device 100 is the HMD 100H, the display unit 131 may be a transmission type display.

The image signal processing unit 132 is an image (video) signal processor configured to process images input from the first image acquisition unit 133 and the second image acquisition unit 134. The image signal processing unit 132 is further configured to superimpose an object created by such as the main controller 101 on the input image and output it to the display unit 131.

The first image acquisition unit 133 is configured to acquire images around the information display device 100. In the case of the HMD 100H, the first image acquisition unit 133 is an external camera. In the case of the smartphone 100S, the first image acquisition unit 133 is a rear camera (out-camera).

The second image acquisition unit 134 is configured to acquire images of a region different from an image acquisition region of the first image acquisition unit 133. For example, the second image acquisition unit 134 acquires images of the eye of the user. In the case of the HMD 100H, the second image acquisition unit 134 is an internal camera (camera for detecting the line-of-sight), and in the case of the smartphone 100S, the second image acquisition unit 134 is a front camera (in-camera).

The audio processing unit 140 is an audio processor for processing audio data, and includes an audio output unit 141, an audio signal processing unit 142, and an audio input unit 143. The audio output unit 141 is a speaker, and is configured to output the audio signal processed by the audio signal processing unit 142 to the outside. The audio signal processing unit 142 is an audio signal processor. The audio input unit 143 is a microphone, and is configured to convert a voice of the user into voice data and input the converted voice data.

The sensor unit 150 includes a group of sensors for detecting a state of the information display device 100. In the first embodiment, the sensor unit 150 includes a Global Positioning System (GPS) reception unit 151, a gyro sensor 152, a geomagnetic sensor 153, an acceleration sensor 154, and a distance sensor 155. The sensor group including the sensors above enables detection of a position, movement, inclination, direction, etc. of the information display device 100. The distance sensor 155 is a depth sensor, and is configured to acquire distance information from the information display device 100 to an object. The sensor unit 150 may further include other sensors.

The communication processing unit 160 is a communication processor, and includes a Local Area Network (LANI) communication unit 161, a telephone network communication unit 162, and a Bluetooth (registered mark, BT) communication unit 163. The LAN communication unit 161 is connected to a wireless communication access point of the Internet via wireless communication to perform transmission and reception of data. The telephone network communication unit 162 is connected to a base station of the mobile telephone communication network via wireless communication to perform telephone communication (telephone call) and transmission and reception of data. The BT communication unit 163 is an interface for communicating with an external device in accordance with the Bluetooth standard. The LAN communication unit 161, the telephone network communication unit 162, and the BT communication unit 163 include such as an encoding circuit, a decoding circuit, and an antenna, respectively. The communication processing unit 160 may further include, for example, an infrared communication unit.

The extended interface unit 170 includes a group of interfaces for extending functions of the information display device 100. In the first embodiment, the extended interface unit 170 includes, for example, a charging terminal, a video/audio interface, a Universal Serial Bus (USB) interface, and a memory interface. The video/audio interface is configured to receive a video signal/audio signal from an external video/audio output device, and output a video signal/audio signal to the external video/audio input device. The USB interface is used to connect a keyboard or other USB devices to the information display device 100. The memory interface is used to connect a memory card and other memory media to the information display device 100 to perform transmission and reception of data.

An appearance and mounting state of the information display device 100 in the case where the information display device 100 is the HMD 100H will be explained. FIG. 3A is a top view of the information display device 100, FIG. 3B is a front view of the information display device 100, and FIG. 3C is a side view of the information display device 100. An arrangement of each unit described in the hardware configuration diagram will be explained.

The HMD 100H includes a frame 109H for supporting each part of the HMD 100H, which is provided for the user to wear the HMD 100H.

The display unit 131 is arranged at the center of a front surface of the frame 109H so as to be on a position in front of both eyes of a user 910.

The touch sensor 122 is arranged on a side surface of the frame 109H. It may be arranged on both left and right side portions, respectively, or may be arranged on either side.

The HMD 100H includes, as the first image acquisition unit 133, a left first image acquisition unit (left external camera) 133L and a right first image acquisition unit (right external camera) 133R. As illustrated in FIG. 3A to FIG. 3C, the left first image acquisition unit 133L and the right first image acquisition unit 133R are arranged on the left and right of the front of the frame 109H of the HMD 100H, respectively.

The HMD 100H includes, as the audio output unit 141, a left audio output unit (left stereo speaker) 141L and a right audio output unit (right stereo speaker) 141R. As illustrated in FIG. 3, the left audio output unit 141L and the right audio output unit 141R are arranged on left and right side surfaces of the frame 109H, respectively.

The distance sensor 155 is arranged at the center of the front surface of the frame 109H. Instead of the distance sensor 155, the left first image acquisition unit 133L and the right first image acquisition unit 133R may be used to measure a distance based on parallax.

The appearance and mounting state of the information display device 100 in the case where the information display device 100 is the smartphone 100S will be explained. FIG. 4A is a front view of the smartphone 100S, and FIG. 4B is a back view of the smartphone 100S. An arrangement of each unit described in the hardware configuration diagram will be explained.

The smartphone 100S includes a casing 109S that houses each part of the smartphone 100S. In the following, the vertical direction and the lateral direction are as illustrated.

The display unit 131 is arranged at the center of a front surface of the casing 109S. In the case of the smartphone 100S, a touch screen 180 serving as both the display unit 131 and the touch panel 123 is arranged.

The first image acquisition unit 133 (rear camera/out-camera) is arranged on a back surface of the casing 109S. The second image acquisition unit 134 (front camera/in-camera) is arranged on the front surface of the casing 109S. The second image acquisition unit 134 is arranged on an upper portion of the front surface of the display unit 131.

The audio output unit 141 is arranged, for example, at an upper central portion of the display unit 131 on the front surface of the casing 109S and a lower portion of the back surface of the casing 109S, respectively. An audio output unit 141M arranged on the upper portion of the front surface of the casing 109S is a monaural speaker, and is used for a voice call. An audio output unit 141S arranged at the lower portion of the back surface of the casing 109S is a stereo speaker, and is used for such as reproduction of a moving image. The audio input unit 143 is arranged on, for example, a lower surface of the casing 109S.

The distance sensor 155 is arranged on the back surface of the casing 109S, for example, next to the first image acquisition unit 133.

In addition, as the operation key 121, for example, a power switch 121P is arranged on an upper surface of the casing 109S, and as the extended interface unit 170, a USB terminal 170U is arranged on the lower surface of the casing 109S. The smartphone 100S may further include, for example, a fingerprint sensor 124 arranged on the back surface of the casing 109S and an LED 125 arranged on an upper portion of the display unit 131 on the front surface of the casing 109S.

[Function Block]

Next, the functions of the information display device 100 will be described. FIG. 5 illustrates a functional block of the information display device 100 according to the first embodiment. The information display device 100 according to the first embodiment generates seat table data, and displays an activity schedule of a person assigned to the seat (seat user) during absence of the person. In order to obtain these functions, the information display device 100 according to the first embodiment includes a presence/absence determination unit 231, a seat information table generation unit 232, and an activity schedule display unit 233.

Furthermore, the information display device 100 according to the first embodiment includes a position information acquisition unit 211, a direction information acquisition unit 212, a distance information acquisition unit 213, a space recognition unit 214, a line-of-sight detection unit 215, a seat selection reception unit 216, a seat position calculation unit 217, an identification image acquisition unit 218, an identification information collation unit 219, a seat information confirmation unit 220, an activity schedule acquisition unit 221, a display control unit 222, and a contact control unit 223. The units above are configured to perform information processing in accordance with control of each hardware.

The main controller 101 loads programs stored in advance in the storage 110 onto the RAM 103, and executes them in order to obtain the functions above.

The storage 110 includes a seat information table 250 generated by the seat information table generation unit 232.

The seat information table generation unit 232 is configured to generate the seat information table 250. The seat information table 250 is a table in which position information of each seat is associated with information of each valid user (assigned user) assigned to each seat. FIG. 6 illustrates an example of the seat information table 250. As illustrated in FIG. 6, the seat information table 250 includes seat information 251 and user information 256.

The seat information 251 is information for specifying each seat in each room. As illustrated in FIG. 6, the seat information 251 includes a seat ID 252, a room ID 253, and seat position information 254. The seat ID 252 is an identifier of each seat, and is uniquely assigned to each seat. The room ID 253 is an identifier of each room, and is uniquely assigned to each room. The seat position information 254 includes coordinates of a seat position. In the first embodiment, absolute coordinates of each seat position are registered therein. The absolute coordinates are defined by, for example, the latitude, longitude, and altitude.

The user information 256 is information for specifying a valid user assigned to each seat. As illustrated in FIG. 6, the user information 256 includes a name 257 and a personal ID 258. The personal ID 258 an identifier of a user, and is uniquely assigned to each user. The user information 256 is information to be managed as personal information in a member database 311 held by the management server 300.

The position information acquisition unit 211 is configured to acquire position information of the information display device 100 based on GPS information received by the GPS reception unit 151. The position information acquisition unit 211 may be configured to acquire the position information by using such as a known indoor positioning system. In the first embodiment, for example, absolute position information such as the latitude, longitude, and altitude is calculated.

The direction information acquisition unit 212 is configured to acquire direction information of the information display device 100 based on output information from the gyro sensor 152 and/or the geomagnetic sensor 153. In the first embodiment, a direction to which the first image acquisition unit 133 of the information display device 100 is directed is calculated as the direction information.

In the case where the information display device 100 is the HMD 100H having the transmission type display unit 131, the direction information acquisition unit 212 acquires, as the direction information, direction information of the front of the display unit 131, that is, a normal direction of a tangent of a central portion of the display unit 131. In the case where the information display device 100 is the smartphone 100S, the direction information acquisition unit 212 acquires, as the direction information, a center direction of a photographing field of view of the first image acquisition unit 133.

The position information acquired by the position information acquisition unit 211 and the direction information acquired by the direction information acquisition unit 212 are used to specify an arrangement state of the information display device 100 including its direction. Therefore, both the position information acquisition unit 211 and direction information acquisition unit 212 are collectively referred to as an own device arrangement information detection unit.

The distance information acquisition unit 213 is configured to acquire distance information to an object based on output information from the distance sensor 155. In the case where the object is not specified, an object corresponding to a center portion of the device configuring the distance sensor 155 is set as the object.

The space recognition unit 214 is configured to perform space recognition processing. Specifically, the space recognition unit 214 analyzes an image acquired by the first image acquisition unit 133 to detect a plurality of feature points. Next, the space recognition unit 214 causes the direction information acquisition unit 212 to acquire direction information on the detected feature points, and also causes the distance information acquisition unit 213 to acquire distance information to the detected feature points. Then, the space recognition unit 214 calculates a relative position relationship between the detected feature points based on the acquired direction information and distance information. The calculated information on the relative position relationship is stored in association with information for specifying the analyzed space (for example, a room). In this way, the space recognition unit 214 recognizes a predetermined space (for example, a room) in which the information display device 100 exists.

The line-of-sight detection unit 215 analyzes the image acquired by the second image acquisition unit 134 to acquire line-of-sight information of the user. In the case of the HMD 100H, the line-of-sight detection unit 215 detects a direction of the line of sight of the user 910, namely, a direction to which the user 910 is seeing through the display unit 131. In the case of the smartphone 100S, the line-of-sight detection unit 215 detects an intersection position between the line of sight of the user 910 and the display unit 131, namely, a position of the display unit 131 at which the user 910 is looking.

The seat selection reception unit 216 is configured to receive, as a seat of a person whose activity schedule is requested to be displayed, selection by the user 910. In the case where the information display device 100 is the HMD 100H, the seat selection reception unit 216 analyzes an input image from the first image acquisition unit 133, and sets, as the seat selected by the user 910 (selected seat), a seat at a position corresponding to the line-of-sight direction detected by the line-of-sight detection unit 215. Specifically, the seat selection reception unit 216 sets, as a selected position, a position corresponding to the intersection position where the line-of-sight direction detected by the line-of-sight detection unit 215 intersects with the display unit 131, which is within a photographing range of the first image acquisition unit 133. Then, upon receiving an operation on the touch sensor 122 by the user 910, the seat selection reception unit 216 confirms the selection. In the case where the information display device 100 is the smartphone 100S, the seat selection reception unit 216 recognizes, as a selected seat, the seat corresponding to a touch position detected by the touch panel 123. In the case of the smartphone 100S as well, the seat selection reception unit 216 may receive the selection based on the line-of-sight information detected by the line-of-sight detection unit 215. In this case, the seat selection reception unit 216 sets, as the selected position, the intersection between the line-of-sight direction and the display unit 131, and confirms the selection based on a touch operation on a “confirm” icon displayed on the display unit 131.

The seat position calculation unit 217 is configured to calculate a position of the selected seat received by the seat selection reception unit 216. The seat position calculation unit 217 calculates position (absolute position) information of the selected seat based on the position information acquired by the position information acquisition unit 211, the direction information acquired by the direction information acquisition unit 212, and the distance information acquired by the distance information acquisition unit 213. Furthermore, if necessary, the space recognition unit 214 recognizes a space (for example, a room), and then the seat position calculation unit 217 calculates, as the position information of the selected seat, relative position information with respect to a reference position in a predetermined space (for example, a room) based on the direction information acquired by the direction information acquisition unit 212 and the distance information acquired by the distance information acquisition unit 213.

The identification image acquisition unit 218 is configured to extract an identification image from the input image. In the first embodiment, a person image is used as the identification image. The extraction is performed by, for example, pattern matching.

The identification information collation unit 219 is configured to refer to a member database 311, which will be described later, to acquire identification information of a member identified based on the person image acquired by the identification image acquisition unit 218. The member database 311 is held in, for example, the management server 300.

The seat information confirmation unit 220 is configured to perform predetermined seat information confirmation processing on the seat selected by the seat selection reception unit 216. For example, in the case where a person is sitting on the selected seat, the seat information confirmation unit 220 makes the position information of the selected seat calculated by the seat position calculation unit 217 associated with the personal ID of the person, who uses the selected seat, acquired by the identification information collation unit 219, and store the information in the seat information table 250. The seat information confirmation unit 220 may be configured to perform the processing above on all the seats included in the image acquired by the first image acquisition unit 133 even without receiving a seat selection instruction by the user 910. In this case, that is, all the seats are treated as selected seats. When no person is sitting on the selected seat, the seat information confirmation unit 220 acquires the personal ID 258 registered, in the seat information table 250, in association with the seat position information 254 of the selected seat calculated by the seat position calculation unit 217. In this case, the seat information confirmation unit 220 functions as an assigned user information acquisition unit.

The activity schedule acquisition unit 221 is configured to refer to an activity schedule database 312, which will be described later, to acquire activity schedule information of a person having the personal ID 258 acquired by the seat information confirmation unit 220. The activity schedule database 312 is stored in advance, for example, in the management server 300.

The display control unit 222 is configured to cause the display unit 131 to display the activity schedule information acquired by the activity schedule acquisition unit 221. In the first embodiment, the activity schedule information is displayed on a position of the selected seat. In the case where the information display device 100 is the HMD 100H of which the display unit 131 is a transmission type display unit, the position of the selected seat is a position on which the line of sight of the user 910, who is seeing the selected seat through the display unit 131, intersects with the display unit 131. In the case where the information display device 100 is the smartphone 100S, the position of the selected seat is a selected seat position in the input image. In the case of the smartphone 100S, the display control unit 222 causes the display unit 131 to display the activity schedule information by superimposing the activity schedule information on the selected seat position in the input image.

The contact control unit 223 is configured to perform processing for establishing a communication path with the mobile information terminal 450 owned by the member identified based on the personal ID 258 acquired by the identification information collation unit 219. In the present embodiment, the contact control unit 223 controls, for example, e-mail, SNS, and video chat application software.

Note that each of the position information acquisition unit 211, the direction information acquisition unit 212, the distance information acquisition unit 213, the space recognition unit 214, the line-of-sight detection unit 215, the seat selection reception unit 216, the seat position calculation unit 217, the identification image acquisition unit 218, the identification information collation unit 219, the seat information confirmation unit 220, the activity schedule acquisition unit 221, the display control unit 222, and the contact control unit 223 performs each processing by using the existing algorithms.

The seat information table generation unit 232 is configured to control each unit to perform seat information table generation processing for generating the seat information table 250 described above. The seat information table generation processing will be described later in detail.

The activity schedule display unit 233 is configured to display a current schedule (activity schedule information) of the assigned user on the selected seat when the assigned user is absent. At this time, future activity schedule information may be further displayed thereon. A method of displaying the activity schedule information above will be described later in detail.

The presence/absence determination unit 231 is configured to perform presence/absence determination processing for determining whether a person is sitting on the selected seat.

The presence/absence determination processing will be described later in detail. The first embodiment does not necessarily include the presence/absence determination unit 231.

[Management Server]

Next, the management server 300 of the first embodiment will be described. FIG. 7 illustrates a hardware configuration of the management server 300 according to the first embodiment.

The management server 300 includes a main controller 301, a bus 302, a RAM 303, a storage 310, an operation reception unit 320, a display unit 331, an image signal processing unit 332, and a LAN communication unit 361.

The main controller 301 is a CPU or an MPU for controlling the entire management server 300 in accordance with predetermined programs. The bus 302 is a data communication path for transmitting and receiving data between the main controller 301 and each unit in the management server 300. The RAM 303 is a program area during execution of a basic operation program or other application programs. Furthermore, the RAM 303 is a temporary storage area for temporarily holding data as necessary during execution of various application programs. The RAM 303 may be integrated with the main controller 301.

The operation reception unit 320 is configured to receive an operation instruction that has been input to the management server 300. In the first embodiment, the operation reception unit 320 includes such as a key board and a mouse.

The display unit 331 is a display device such as a liquid crystal panel, and configured to present the image data processed by the image signal processing unit 332, which will be described later, to a user of the management server 300. The image signal processor unit 332 is an image (video) processor.

The LAN communication unit 361 is connected to the internal network 410 via wired communication to perform transmission and reception of data.

The storage 310 is configured to store information necessary for processing to be executed in the management server 300. The main controller 301 loads and executes application programs stored in the storage 310 onto the RAM 303 so that the information display device 100 can obtain the various functions. As the storage 310, for example, a device such as a flash ROM, a Solid State Drive (SSD), or a Hard Disc Drive (HDD) is used.

The management server 300 of the first embodiment is configured to manage data required by the information display device 100 to perform the information display processing. In response to a request from the information display device 100, the management server 300 provides the information display device 100, which is a source of the request, with necessary data (information).

In the first embodiment, in order to realize the management above, the member database 311 and the activity schedule database 312 are stored in the storage 310. As will be described later, in the management server 300, a PC operation information table 313 and a seat information table 315 may be further managed.

In the member database 311, information of members whose seats are to be managed is managed. FIG. 8 illustrates an example of the member database 311. As illustrated in FIG. 8, personal information 311*a* and a face image 311*d* for authentication are registered for each member in the member database 311.

The personal information 311*a* is information for uniquely identifying each member, and in the first embodiment, includes, for example, a name 311*b* and a personal ID 311*c*. Each time a member is registered, the personal ID 311*c* is provided thereto.

A face image of each member is registered in the face image 311*d* for authentication. As the face image, face images acquired from various directions, such as a front image and a side image may be registered. Instead of the face image for authentication itself, access information to a location where the face image for authentication is stored may be registered in the face image 311*d* for authentication.

As contact information 311*e*, for example, a telephone number and e-mail address of a mobile device may be further registered for each member.

In the activity schedule database 312, activity schedules of each member are registered. FIG. 9 illustrates an example of the activity schedule database 312. As illustrated FIG. 9, personal information 312*a* and activity schedule information 312*j* are registered for each member in the activity schedule database 312.

The personal information 312*a* is information for uniquely identifying each member, and includes, for example, a name 312*b* and a personal ID 312*c*.

The activity schedule information 312*j* includes activity schedules of each member. As the activity schedule information, for example, a schedule number (No.) 312*d* for identifying each activity schedule, a start date and time 312*e*, an end date and time 312*f*, a content 312*g*, and a location 312*h* are registered for each activity schedule.

In this connection, each schedule may include disclosure information 312*i*, which indicates a level of disclosure or non-disclosure. The disclosure information 312*i* is presented depending on a disclosure target. Details of the disclosure information 312*i* will be described later.

Note that the main controller 301 of the management server 300 appropriately updates the information registered in the storage 310 in accordance with an instruction from a user or a signal from the outside.

Next, each processing of the information display device 100 will be described.

[Seat Information Table Generation Processing]

Firstly, the seat information table generation processing, which is performed by the seat information table generation unit 232 as preliminary processing (initial processing), will be described. As illustrated in FIG. 10A, the seat information table 250 is generated, for example, in a state where each valid assigned user is sitting on each seat in a specific room A.

In the state above, the user 910 captures an image of the room A by using the information display device 100 to generate the seat information table 250. FIG. 10B illustrates an example of an image (input image 500) displayed at this time on the display unit 131 of the information display device 100. This example is in the case where the information display device 100 is the smartphone 100S. That is, this example is a display example of the touch screen 180 of the smartphone 100S.

Upon acquiring the input image 500, the seat information table generation unit 232 of the first embodiment starts the seat information table generation processing. FIG. 11 illustrates a processing flow of the seat information generation processing according to the first embodiment.

Firstly, the seat information table generation unit 232 acquires the position information of the own device (information display device) 100 (step S1101). Here, the position information is acquired by the position information acquisition unit 211.

Next, the seat information table generation unit 232 acquires the direction information of the information display device 100 (step S1102). Here, the direction information is acquired by the direction information acquisition unit 212. FIG. 12A illustrates a direction a acquired as the direction information of the information display device 100.

As illustrated in FIG. 12A, the direction information acquisition unit 212 calculates, as an angle α, an angle formed by, for example, a predetermined reference direction 958 such as the north and a normal direction 959 of the first image acquisition unit 133. In order to simplify the explanation, FIG. 12A illustrates the horizontal plane only.

The seat information table generation unit 232 receives, from the user 910, designation of a seat 511 to be registered in the seat information table 250 (registration target seat 511) (step S1103). The seat information table generation unit 232 receives the designation of the registration target seat 511 via the seat selection reception unit 216.

The seat information table generation unit 232 calculates a distance Ls from the information display device 100 to the registration target seat 511 as registration seat distance information (step S1104). The distance Ls is acquired by the distance information acquisition unit 213.

Then, the seat information table generation unit 232 calculates, as registration seat position information, an absolute coordinate value of the registration target seat 511 by using the position information and direction information of the information display device 100 and the distance information to the registration target seat 511 (step S1105). The registration seat position information is calculated by the seat position calculation unit 217.

A calculation procedure of the registration seat position information will be described with reference to FIG. 12A and FIG. 12B. For example, the reference direction 958 is set as a Y-direction of the absolute coordinate system, and the absolute coordinates of the information display device 100 are set as (xo, yo). In addition, an angle obtained from a deviation amount between a center position CC in an image sensor of the first image acquisition unit 133 and the position of the registration target seat 511 is set as an angle $\beta$. The angle $\beta$ is calculated based on a ratio of the number of pixels on the image sensor from the center position CC of the image sensor to the registration target seat 511 with respect to half the number of horizontal pixels of the image sensor of the first image acquisition unit 133, and a ratio between an angle of a photographing field of view of the image sensor of the first image acquisition unit 133 and the angle $\beta$. In this case, as illustrated in FIG. 12B, the Y-coordinate of the registration seat position information of the registration target seat 511 in the horizontal plane is $yo+Ls\cos(\alpha-\beta)$. The X-coordinate of the registration seat position information thereof is $xo+Ls\sin(\alpha-\beta)$.

Next, the seat information table generation unit 232 acquires a face image as an identification image of an assigned user 512 of the registration target seat 511 (step S1106). The face image is acquired by the identification image acquisition unit 218. Here, as illustrated in FIG. 10B, a face region 522 of a person near a region 521 corresponding to the registration target seat 511 is specified on the input image 500. The face region 522 of the person is specified by, for example, pattern matching. The face image is obtained by cutting out a predetermined region 523 including the specified face region 522 in the input image 500.

The seat information table generation unit 232 acquires, from the management server 300, the personal ID 311*c* of a member whose face image matches the acquired face image (step S1107). Here, the personal ID 311*c* is acquired by the seat information confirmation unit 220. Specifically, the seat information confirmation unit 220 accesses the member database 311 of the management server 300 to collate the acquired face image with each face image 311*d* for authentication. Then, the seat information confirmation unit 220 extracts a record of the personal ID 311*c* having the matching degree which is equal to or higher than a predetermined threshold and the highest among other records. At this time, the seat information confirmation unit 220 may acquire the name 311*b* as well.

The seat information table generation unit 232 registers, in the seat information table 250, the registration seat position information in association with the personal ID 311*c* (step S1108). In the registration step above, the seat ID 252 and the room ID 253 are made associated with the seat information 251. The room ID 253 is provided based on an instruction from the user 910. The seat ID 252 is automatically provided each time a new record is registered.

Upon newly receiving selection of a registration target seat (step S1109), the seat information table generation unit 232 returns to step S1104. On the other hand, in the case of not newly receiving the selection of a registration target seat, the seat information table generation unit 232 determines that generation of the seat information table 250 from the input image is completed, and terminates the processing.

In the processing described above, the seat information table generation unit 232 performs the seat information registration processing only for the registration target seat designated by the user 910. Meanwhile, the seat information table generation unit 232 may be configured to perform the seat information registration processing for all the seats, on which the users are sitting, in the image acquired by the first image acquisition unit 133.

The user 910 makes the seat information table generation unit 232 of the information display device 100 perform the seat information table generation processing described above, as the preliminary processing, to complete the seat information table 250. In the first embodiment, even after completion of the seat information table 250, the information display device 100 may analyze through images acquired by the first image acquisition unit 133 while being in operation to always update the seat information table 250. Details of the processing in this case will be described later as a modification.

[Activity Schedule Display Processing]

Next, activity schedule display processing will be described. This processing is executed when an instruction is provided by the user 910. That is, the processing is executed when the user 910 selects a predetermined seat, for example, on the input image 500 displayed on the display unit 131 of the information display device 100. The seat selection reception unit 216 receives the selection above.

FIG. 13A illustrates a state of a real space of a predetermined room A. In the first embodiment, when an assigned user 532 of a selected seat 531 is absent, a schedule of the assigned user 532 is displayed. As illustrated in FIG. 13B, a target marker 180M is displayed at a seat position 541 of the assigned user 532 selected by the user 910 on the input image 500.

FIG. 14 illustrates a processing flow of the activity schedule display processing. This processing is started when the user 910 designates, on the input image 500, a seat (seat position 541) where the assigned user 532 is absent. The designated seat 531 is referred to as the display target seat 531.

Firstly, the activity schedule display unit 233 acquires the position information and direction information of the information display device 100 in the same manner as the processing by the seat information table generation processing (step S1201, step S1202).

Next, the activity schedule display unit 233 acquires the distance information to the display target seat (step S1203) to calculate the position information of the display target seat as the display seat position information (step S1204). These steps above are also performed in the same manner as the seat information table generation processing. The display seat position information is expressed by absolute coordinates.

The display seat position information is calculated by using angle information of the display target seat. In order to calculate the angle information, firstly, as illustrated in FIG. 15, the activity schedule display unit 233 calculates, as an angle $\alpha$, an angle formed by the reference direction 958 and a normal direction 959 of the first image acquisition unit 133. In order to simplify the explanation, FIG. 15 illustrates the horizontal plane only. The activity schedule display unit 233 set, as an angle $\gamma$, an angle obtained from a deviation amount between the center position CC in the image sensor of the first image acquisition unit 133 and the position of the display target seat 531. A calculation procedure of the angle γ is the same as that of the seat information table generation processing. Then, the angle information of the display target seat 531 is obtained as a difference between the angle γ and the angle α.

Upon acquiring the display seat position information of the display target seat 531, the activity schedule display unit 233 accesses the seat information table 250 to extract the personal ID 258 of a user associated with the seat position information 254 corresponding to the acquired display seat position information (step S1205). The personal ID 258 is extracted by the seat information confirmation unit 220.

The activity schedule display unit 233 accesses the management server 300 to acquire activity schedule information associated with the personal ID 312*c*, which is the same as the personal ID 258, from the activity schedule database 312 (step S1206). The activity schedule information is acquired by the activity schedule acquisition unit 221. Here, the activity schedule information to be acquired is a record in which the current time is included between the start date and time 312*e* and the end date and time 312*f*. Meanwhile, the activity schedule display unit 233 may extract all the records after the current time.

The activity schedule display unit 233 displays the extracted activity schedule information on the display unit 131 (step S1207), and then terminates the processing. The displaying step above is performed by the display control unit 222.

FIG. 16A and FIG. 16B illustrate display examples in the displaying step described above. In the case where the information display device 100 is the smartphone 100S, as illustrated in FIG. 16A, the display control unit 222 displays activity schedule information 180S by superimposing it on the seat position 541 of the display target seat on the touch screen 180. The display control unit 222 may superimpose and display the activity schedule information 180S on a position different from the seat position 541 while connecting the displayed activity schedule information 180S and the seat position 541 by such as a leader line. On the other hand, in the case of the HMD 100H, the display control unit 222 displays the activity schedule data 180S at a position of the display target seat on the transmission type display unit 131. In this case, the position of the display target seat is a position on which a line segment connecting the eye of the user 910 and the display target seat 531 intersects with the display unit 131. In this way, as illustrated in FIG. 16B, the user can see the real space AA and the displayed activity schedule information 180S, simultaneously.

As described above, the information display device 100 of the first embodiment is configured to display activity schedule information of the assigned user 512, who is the user assigned to the seat in advance. The information display device 100 includes: an own device arrangement information detection unit configured to detect position information and direction information of the information display device 100; a distance information acquisition unit 213 configured to acquire distance information from the information display device 100 to a display target seat 531 that is a seat of an assigned user 532 whose activity schedule information is to be displayed; a seat position calculation unit 217 configured to use the position information, the direction information, and the distance information to calculate, as position information of the display target seat 531, display seat position information; an activity schedule acquisition unit 221 configured to extract, for each of the seats, from a seat information table 250 which registers assigned user information of assigned users of the seats in association with registration seat position information that is position information of the seats, one piece of the assigned user information registered in association with one piece of the registration seat position information which is closest to the display seat position information, and acquire a current activity schedule information among the activity schedule information registered in association with the one piece of the assigned user information; and a display control unit 222 configured to display the acquired activity schedule information on a display unit 131 of the information display device 100.

As described above, according to the first embodiment, the information display device 100 uses the group of sensors included therein to calculate a position and direction of the own device and a seat position of an absent assigned user, acquire information of the assigned user from the seat information held in advance, and display the acquired schedule of the assigned user. According to the first embodiment, since there is no need to prepare AR markers in advance, it is possible to display the activity schedule of the absent assigned user without labor and restriction for the preparation above.

The information display device according to the first embodiment further includes a seat information table generation unit 232 configured to acquire an image including the assigned user while the assigned user is present in the seat assigned thereto to generate the seat information table. The seat information table generation unit 232 includes: an identification image acquisition unit 218 configured to acquire an identification image capable of identifying the assigned user 512 of a registration target seat 511 that is a seat to be registered; and an assigned user information acquisition unit configured to acquire personal information 311*a* registered in association with the identification image and use the acquired personal information as the assigned user information. The seat information table generation unit 232 is configured to: cause the distance information acquisition unit 213 to acquire distance information to the registration target seat as registration seat distance information, cause the seat position calculation unit 217 to calculate position information of the registration target seat 511 as the registration seat position information by using the position information, the direction information, and the registration seat distance information; and register the registration seat position information in association with the assigned user information so as to generate the seat information table.

As described above, according to the first embodiment, each information display device 100 is configured to perform the processing of generating the seat information table 250 as preliminary processing. Accordingly, for example, even when there is a bias in the sensor unit 150 of each information display device 100, it is possible to accurately specify a seat position at which an activity schedule is to be displayed.

Furthermore, according to the first embodiment, the activity schedule is displayed at a position corresponding to a display target seat position on the display unit 131. Accordingly, the user 910 can easily grasp the relation between the displayed activity schedule and the assigned user who owns the displayed activity schedule.

Still further, according to the first embodiment, the information display device 100 is configured to display the activity schedule of the assigned user of the seat designated by the user 910. Accordingly, the user 910 can efficiently obtain the desired information.

First Modification

The information display device 100 according to the first embodiment described above is configured to display the activity schedule of the assigned user of the seat which is intentionally designated by the user 910 (display target seat). Meanwhile, the present invention is not limited thereto.

For example, it may be configured to, when the user 910 of the information display device 100 directs the information display device 100 in a direction of an arbitrary seat in a room or the like, specify an assigned user of the seat above based on such as the position of the seat, and if the assigned user is present in the seat, display nothing, but if the assigned user is not present in the seat, acquire the activity schedule information of the assigned user from the management server 300 and display (superimpose) the acquired activity schedule information on the position of the seat.

In the state where the user 910 is directing the information display device 100 in a direction of an arbitrary seat, specifically, the display target seat is arranged near the center of the field of view range (a vicinity of the center position CC in the image sensor) of the first image acquisition unit 133. It may be configured to display the activity schedule information of the assigned user immediately after the display target seat is arranged near the center of the field of view range of the first image acquisition unit 133, or display it when the display target seat is continuously arranged near the center of the field of view range of the first image acquisition unit 133 for a predetermined time or longer.

In this case, the information display device 100 is required to include the presence/absence determination unit 231. Here, the presence/absence determination unit 231 is configured to specify a display target seat every time the information display device 100 acquires through images at predetermined time intervals to determine whether the assigned user is present (seated) in the seat or away (non-seated) from the seat.

In the present embodiment, for example, the presence/absence determination unit 231 cuts out, as a collation target image, an image of a predetermined region including a seat determined as the display target seat. Then, the presence/absence determination unit 231 collates the collation target image with images for collation previously held in the storage 110 to determine whether the assigned user is present or absent.

As illustrated in FIG. 17A, the images for collation held in the storage 110 include, for example, a presence image 551 and an absence image 552. The presence/absence determination unit 231 collates the collation target image with the presence image 551 and the absence image 552, respectively, and outputs a determination result in accordance with height of the matching degree.

For example, it is assumed herein that a seat 560 is a display target seat. In FIG. 17B, for example, the presence/absence determination unit 231 extracts an image region surrounded by a broken line 561 including the seat 560 on the input image 500 (not illustrated) obtained by capturing an image of the room A, and uses the extracted image as a collation target image. In the case of the collation target image of FIG. 17B, the presence image 551 have the higher matching degree, and accordingly, the presence/absence determination unit 231 determines that the assigned user is present. In FIG. 17C, for example, the presence/absence determination unit 231 extracts an image region surrounded by the broken line 561 on the input image 500 (not illustrated) obtained by capturing an image of the room A, and uses the extracted image as a collation target image. In the case of the collation target image of FIG. 17C, the absence image 552 has the higher matching degree, and accordingly, the presence/absence determination unit 231 determines that the assigned user is absent.

FIG. 18 illustrates a flow of the activity schedule display processing according to this case. The processing above is executed at predetermined time intervals. For example, the processing is executed every time the information display device 100 acquires a through image.

The presence/absence determination unit 231 cuts out, as a collation target image, a vicinity area including a seat arranged substantially at the center of a through image (step S1301), and determines whether an assigned user is absent (step S1302).

In step S1302, when the presence/absence determination unit 231 determines that the assigned user is absent (S1302; YES), the activity schedule display unit 233 performs the processing of step S1201 and the subsequent steps of the first embodiment to display the activity schedule of the assigned user of the seat. On the other hand, when the presence/absence determination unit 231 determines that the assigned user is not absent, namely that the assigned user is present in the seat (S1302; No), the activity schedule display unit 233 terminates the processing without performing any further steps.

According to the first modification, it is possible to further reduce the labor of the user 910.

Second Modification

In the first embodiment, the information display device 100 is configured to execute the seat information table generation processing for generating the seat information table 250 and the activity schedule display processing separately and independently. Meanwhile, the present invention is not limited to thereto. For example, the information display device 100 may be configured to execute both the processing in parallel. That is, for a seat in which the assigned user is present, the seat information table generation processing is performed by generating the seat information table 250 each time a through image is acquired, while for a seat in which the assigned user is not present, the activity schedule display processing is performed.

In this case, for a person who is not registered in the seat information table 250 and is not sitting on the seat, information for notifying the above may be displayed. The functional blocks in this case are the same as those in the first modification.

FIG. 19 illustrates a flow chart of the processing according to this case. This processing is executed every time a through image is acquired.

Firstly, the activity schedule display unit 233 causes the position information acquisition unit 211 and the direction information acquisition unit 212 to acquire the position information and direction information of the own device (information display device 100) at the time of acquiring the through image, respectively (step S1401, step S1402).

Next, the activity schedule display unit 233 extracts seat regions in the through image (step S1403), and provides the extracted seat regions with the sequential numbers in order from 1 where the provided last number, in other words, the number of extracted seats is "n" ("n" is an integer greater than or equal to 1). The seat regions are extracted by, for example, pattern matching.

The activity schedule display unit 233 performs the following processing with respect to the extracted seat regions in order from the seat region whose provided number is 1 (step S1404).

Firstly, the activity schedule display unit 233 causes the distance information acquisition unit 213 to acquire the distance to the seat in the real space corresponding to the n-th seat region (hereinafter, referred to as a target seat) (step S1405). Next, the activity schedule display unit 233 causes the seat position calculation unit 217 to calculate the seat position information of the target seat (step S1406).

Next, the presence/absence determination unit 231 determines whether the user is present in the target seat (step S1407).

When the presence/absence determination unit 231 determines that the user is present in the target seat (step S1407; No), the seat information table generation unit 232 performs the seat information table generation processing. The seat information table generation processing performed in the step above is basically the same as that of the first embodiment. Meanwhile, in the case where the record of the target seat is already registered in the seat information table 250, the processing of updating the record is performed.

That is, firstly, the seat information table generation unit 232 causes the identification image acquisition unit 218 to extract a face image of a person (seated person) sitting on the target seat (step S1408). Then, the personal ID 311*c* and the name 311*b* of a member whose face image matches the extracted face image are acquired from the member database 311 (step S1409).

Next, the seat information table generation unit 232 accesses the seat information table 250 to determine whether a record having the seat position information is already registered (step S1410). When such a record is not registered (step S1410; No), the seat position information is registered in association with the personal ID 311*c* in the seat information table 250 as a new record (step S1411). When the record is already registered (step S1410; Yes), the processing of updating the registered record is performed (step S1412).

Then, the seat information table generation unit 232 determines whether the processing has been completed for all the extracted seats (step S1413). When there is an unprocessed seat, the processing returns to step S1405 for the seat to be processed next (step S1414).

In the updating processing performed in step S1412, the seat information table generation unit 232 overwrites the user information 256 of the record having the seat position information 254 specified in step S1406 with the personal ID 311*c* and name 311*b* extracted in step S1409. Then, the seat information table generation unit 232 determines whether there are other records in which the personal ID 311*c* extracted in step S1409 is registered in the personal ID 258 of the user information other than the overwritten record. When such a record is found, the seat information table generation unit 232 deletes the record, and when no such a record is found, proceeds to step S1413.

When the presence/absence determination unit 231 determines in step S1407 that the user is not sitting on the target seat (step S1407; No), the activity schedule display unit 233 performs the activity schedule display processing. The activity schedule display processing performed in the step above is basically the same as the activity schedule display processing of the first embodiment.

Firstly, the activity schedule display unit 233 accesses the seat information table 250 to extract the personal ID 258 of a user associated with the seat position information (step S1205). The activity schedule display unit 233 accesses the management server 300 to acquire, from the activity schedule database 312, the activity schedule information associated with the personal ID 312*c* which is the same as the personal ID 258 (step S1206). Then, the activity schedule display unit 233 displays the extracted activity schedule information on the display unit 131 (step S1207), determines whether the processing has been completed for all the extracted seats, and returns to step S1404 when there is an unprocessed seat (step S1413; No).

When determining in step S1413 that the processing has been completed for all the extracted seats (S1413; YES), the activity schedule display unit 233 terminates the processing.

In the second modification as well, it may be configured to generate the seat information table 250 as the preliminary processing, and thereafter, update the existing seat information table 250.

According to the second modification, the latest information is always held in the seat information table 250, whereby the seat information table 250 can work even when the seating arrangement is changed.

Third Modification

In the first embodiment and the modifications, the seat is specified by using coordinate values of the absolute coordinates. Meanwhile, the position information for specifying a seat is not limited thereto. For example, the position information of a seat may be relative position information in a predetermined room with respect to a reference position that is set on a predetermined place in the predetermined room. That is, the position of the seat may be specified by using a coordinate system of which the origin is set on the reference position. The processing according to this case will be described while focusing on the features different from those of the first embodiment and the modifications.

In the following, space information creation processing performed by the space recognition unit 214 will be described.

Firstly, the information display device 100 acquires an image of a predetermined region of a predetermined room that is an object of space recognition. Here, an example of the room A which is the same room of FIG. 10A will be described.

The space recognition unit 214 analyzes the acquired image (input image 500) to acquire a position relationship between feature points in the input image 500 (space recognition) and determine a reference position. The space recognition processing and a procedure for determining the reference position will be described with reference to FIG. 20A and FIG. 20B. In order to simplify the explanation, the processing in the horizontal plane will be described. FIG. 21 illustrates a processing flow of the space recognition processing according to this case.

The space recognition unit 214 analyzes the input image 500 to detect a plurality of feature points 611 (step S1501). As the plurality of feature points, for example, corners of a structure which basically does not move or is unlikely to move in a predetermined room, such as contact points between a column and a ceiling or corners of a fixed desk, are selected.

Then, the space recognition unit 214 causes the direction information acquisition unit 212 to acquire direction information on the detected feature points 611 (step S1502). The direction information is a relative direction with respect to a direction of the information display device 100 at the time of detection, and is obtained as an angle with respect to the normal direction 959 of the first image acquisition unit 133.

Furthermore, the space recognition unit 214 causes the distance information acquisition unit 213 to acquire distance information of each of the feature points 611 (step S1503). The distance information indicates a distance from the position of the information display device 100 at the time of detection to each of the feature points 611.

The space recognition unit 214 sets a representative one of the feature points 611 as the reference position 650 (step S1504). For example, one of the feature points 611 which meets a predetermined condition is set as the reference position 650. The predetermined condition is, for example, that a distance obtained as the distance information is the largest, or that a structure of a building has the least possibility of moving. In the example of FIG. 20, the corner of the column at the farthest position from the information display device 100 (contact point with the ceiling) is set as the reference position 650. The information indicating where the reference position 650 is set is held, as reference position information, in association with each room in the storage 110 as space information.

Then, the space recognition unit 214 calculates, for each of the feature points 611, relative position information with respect to the reference position 650 by using the direction information and the distance information (step S1505). The calculated relative position information is used as the space information (feature point map) of the room A, and registered in association with the room A in the storage 110 as the space information (step S1506).

FIG. 20B illustrates an example of space information 610 to be registered. Each circle indicated by a broken line represents each one of the feature points 611 detected by the space recognition processing, and a representative one of the feature points 611 is the reference position 650. Each of the feature points 611 has the relative position information from the reference position 650. The relative position information enables identification between the room A and other rooms.

The seat information table generation unit 232 acquires each piece of the seat position information 254 as information capable of specification in the space information, and stores the acquired information in the seat information table 250. This information is referred to as the relative position information.

For example, the seat position information of each seat is expressed by a coordinate system of which the origin is the reference position 650, and is registered as the seat position information 254 in the seat information table 250. The X-axis direction and Y-axis direction of the coordinate system can be arbitrarily set, for example, on the horizontal plane. For example, a predetermined direction of a line segment connecting the feature points other than the reference position and the reference position is set as the X-axis direction while the direction perpendicular to the X-axis on the horizontal plane is set as the Y-axis direction. Furthermore, for example, a predetermined reference direction such as the north may be set as the Y-axis direction while setting the direction perpendicular to the Y-axis on the horizontal plane as the X-axis. The vertical direction is set as the Z-axis direction. In this case, the coordinate system is also registered as the space information 610 together with the feature point map.

The coordinates of each seat 612, of which the origin is the reference position 650, is calculated as follows. Firstly, the direction information acquisition unit 212 of the information display device 100 acquires, as illustrated in FIG. 20A, relative angle difference information 5 between the reference position 650 and a seat 612. For example, the relative angle difference information 5 is obtained based on the difference between an angle of the seat 612, which is calculated based on a deviation amount between the center position CC in the image sensor of the first image acquisition unit 133 and the position of the seat 612, and an angle of the reference position 650, which is calculated in the same manner as the angle of the seat 612.

The relative angle difference information 5, a distance Ls0 from the information display device 100 to the reference position 650, and a distance Ls1 from the information display device 100 to the seat 612 are used to calculate the position information of the seat 612 with respect to the reference position 650 (relative position information), and stored in the seat information table 250 as the seat position information 254.

The other steps of the processing of creating the seat information table 250 are the same as those of the first embodiment.

Note that as the feature points 611, points of a structure which does not move or is less likely to move, such as corners of a room, corners of a window frame, or corners of a cabinet, are used.

Next, the activity schedule display processing according to the third modification will be described. FIG. 22 illustrates a processing flow of the activity schedule display processing according to the third modification. In the following, the processing will be described while focusing on features different from those of the first embodiment. The activity schedule display processing according to the third embodiment differs from that of the first embodiment in a procedure of calculating the position information of a target seat. In the third modification as well, it is assumed that the processing is started when the user 910 designates a display target seat.

FIG. 23A illustrates a display example of the touch screen 180 at the start of the activity schedule display processing. The target marker 180M is displayed at the position selected by the user 910 as the display target seat.

Firstly, the activity schedule display unit 233 causes the space recognition unit 214 to recognize a space of the target room (room A) to acquire reference position data (step S1601).

Specifically, the space recognition unit 214 analyzes the input image 500 acquired by the first image acquisition unit 133 to extract a plurality of feature points. Then, the direction information acquisition unit 212 acquires the direction information of the plurality of extracted feature points. In addition, the distance information acquisition unit 213 acquires the distance information of each of the feature points. The space recognition unit 214 calculates a relative position relationship between each of the feature points based on the acquired direction information and distance information. Then, the space recognition unit 214 compares the calculated relative position relationship with the space information 610 registered in the storage 110 to specify that the current position of the information display device 100 is in the room A, and further specify the reference position 650 of the room A.

The activity schedule display unit 233 causes the direction information acquisition unit 212 to acquire, as illustrated in FIG. 23B, the relative angle difference information c between the reference position 650 and the display target seat 622 (step S1602).

The activity schedule display unit 233 causes the distance information acquisition unit 213 to acquire, based on the output from the distance sensor 155, the distance information from the information display device 100 to the display target seat 622 (step S1603).

The activity schedule display unit 233 causes the seat position calculation unit 217 to calculate the position information (relative position information) of the display target seat 622 with respect to the reference position 650 (step S1604). The seat position calculation unit 217 acquires the relative position information above based on the direction information and distance information of the reference position 650, and the relative angle difference information c and distance information of the display target seat 622.

The activity schedule display unit 233 causes the seat information confirmation unit 220 to extract, from the seat information table 250, the personal ID 258 of a user associated with the calculated relative position information (step S1605).

The subsequent steps are the same as those in the activity schedule acquisition processing of the first embodiment. That is, the activity schedule display unit 233 causes the activity schedule acquisition unit 221 to acquire, from the activity schedule database 312 of the management server 300, the activity schedule information associated with the personal ID 312*c* which is the same as the personal ID 258 (step S1206).

The activity schedule display unit 233 causes the display control unit 222 to display the extracted activity schedule information on the display unit 131 (step S1207), and then terminates the processing.

For example, in places such as indoors where radio waves of GPS do not reach, the absolute value coordinates of the information display device 100 cannot be acquired. According to the third modification, even in such places, the activity schedule information of the assigned user of the desired seat can be obtained.

Fourth Modification

Figure 24A:

In the first embodiment, the information display device 100 is configured to extract and display, as illustrated in FIG. 24A, the content 312*g* and location 312*h* of the activity schedule from the activity schedule database 312. Meanwhile, a display mode of the activity schedule is not limited to thereto.

Figure 24B:

For example, as illustrated in FIG. 24B, the activity schedule display unit 233 may be configured to extract, from the activity schedule database 312, the start date and time 312*e* and the end date and time 312*f*, and display them together with the content 312*g* and the location 312*h*.

Figure 24C:
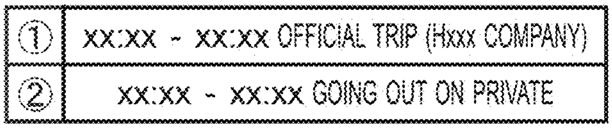

Furthermore, in the first embodiment, the activity schedule display unit 233 acquires, from the activity schedule database 312, the activity schedule of the record including the current time. Meanwhile, the activity schedule to be acquired is not limited to thereto. For example, the activity schedule display unit 233 may be configured to extract the activity schedule of the record including the current time and the next activity schedule, or extract all the activity schedules after the current time, and display them. FIG. 24C illustrates a display example of this case.

Figure 24D:

Still further, in the case where disclosure and non-disclosure can be set in the schedule, and when non-disclosure is set, only the fact that the schedule has been occupied may be displayed while information on the content and place of the schedule is hidden. FIG. 24D illustrates a display example according to this case. In this case, the disclosure information 312*i* indicating whether the schedule is to be disclosed or not disclosed is added to the activity schedule database 312 for each schedule (record).

When accessing the activity schedule database 312 to acquire the activity schedule information, the activity schedule display unit 233 refers to the disclosure information 312*i*. In the case where the disclosure information 312*i* indicates non-disclosure, the activity schedule database 312 does not acquire the activity schedule information, and then displays only the fact that "schedule is occupied" as the activity schedule information. Alternatively, the activity schedule database 312 may display information for notifying that the schedule is not disclosed.

Still further, in this case, a level of disclosure and non-disclosure may be set in accordance with an attribute of a requester. For example, it may be set such that the schedule is disclosed to the user 910 in the case where the user 910 belongs to the same department but not disclosed to the user 910 in the case where the user 910 belongs to the different department.

In this case, a disclosure range is determined in advance in accordance with the level of disclosure and non-disclosure. Then, the activity schedule display unit 233 determines whether to disclose or not disclose the schedule based on the relationship between a user of the target seat and the user 910. When determining that the information should be disclosed, the activity schedule display unit 233 acquires and displays the activity schedule information.

For example, the information display device 100 stores, in the storage 110, information (attribute information) for specifying an attribute such as a department to which the owner belongs. Also, the attribute information is added to and stored in the personal information 312*a* of the activity schedule database 312. The activity schedule display unit 233 determines whether to disclose or not disclose the schedule based on the attribute information of the user 910, the attribute information of the user of the target seat, and the disclosure level.

Fifth Modification

Operation information of a personal computer (PC) used by the user 910 may be added to the absentee information display.

For example, the management server 300 manages the operation information of a PC placed in each seat. For example, as illustrated in FIG. 25, personal information 313*a* (a name 313*b* and a personal ID 313*c*), a log-in ID 313*d*, a log-in password (PW) 313*e*, an operation status 313*f*, and a log-out time 313*g* are managed in the PC operation information table 313.

The login ID 313*d* and the login PW 313*e* are a user ID and a password, respectively, used by each user 910 to log in to his or her PC.

The operation status 313*f* stores information indicating whether the PC used by each user 910 is currently on-line. This information indicates whether the user logs in the PC.

The log-out time 313*g* is information about a time at which each person lastly logs out his or her PC. By comparing the log-out time 313*g* with the current time, an elapsed time after the PC has become inactive can be calculated.

For example, when accessing the activity schedule database 312 and finding that there is no activity schedule stored in association with the corresponding personal ID 312*c*, the activity schedule display unit 233 accesses the PC operation information table 313. Then, the activity schedule display unit 233 extracts the operation status 313*f* and log-out time 313*g* managed in association with the personal ID 313*c*.

Figure 24E:

When the operation status 313*f* indicates that the PC is active, the activity schedule display unit 233 displays the operation status 313*f* as illustrated in FIG. 24E. On the other hand, when the operation status 313*f* indicates that the PC is inactive, the activity schedule display unit 233 displays the log-out time 313*g*.

For example, displaying that the PC is active allows the user 910 to know that there is no current schedule and the PC is active. As a result, the user 910 can understand there is a high possibility that the assigned user leaves his or her seat for a short term while staying at an office. On the other hand, displaying the last log-out time enables the user to understood that the assigned user is likely to have left the office.

The use of the PC operation information is not limited to the above. For example, even in the case where an activity schedule is registered, the activity schedule display unit 233 may further access the PC operation information table 313.

In this case, the activity schedule display unit 233 may display the operation status 313*f* and/or the log-out time 313*g* acquired from the PC operation information table 313 together with the activity schedule.

Sixth Modification

The information display device 100 may be configured to allow the user to contact the assigned user when he or she is absent. In this case, the member database 311 includes the contact information 311*e*.

Figure 24F:
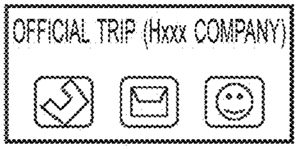

As illustrated in FIG. 24F, the activity schedule display unit 233 displays an icon for activating a communication means on the display unit 131 together with the activity schedule information. Upon receiving the selection from the user 910, the activity schedule display unit 233 extracts, from the contact information 311*e* of the member database 311, a contact address corresponding to the selection, and activates the corresponding application for communication.

The communication means includes, for example, a telephone number of a mobile phone, e-mail address of a mobile terminal, and member ID of a social networking service (SNS) of a seat user.

For example, when a telephone call is designated, the activity schedule display unit 233 starts a telephone application and starts calling based on the acquired telephone number information. When transmission of an e-mail is designated, the activity schedule display unit 233 presents an e-mail creation screen while designating a transmission address based on the acquired e-mail address information.

Seventh Modification

In the first embodiment and modifications above, the activity schedule display unit 233 displays, in the activity schedule display processing, only the activity schedule information 180S of a user who is not sitting on the seat. Meanwhile, for example, it may be configured to also display the activity schedule information 180S of a user who is present in his or her seat.

Figure 24G:
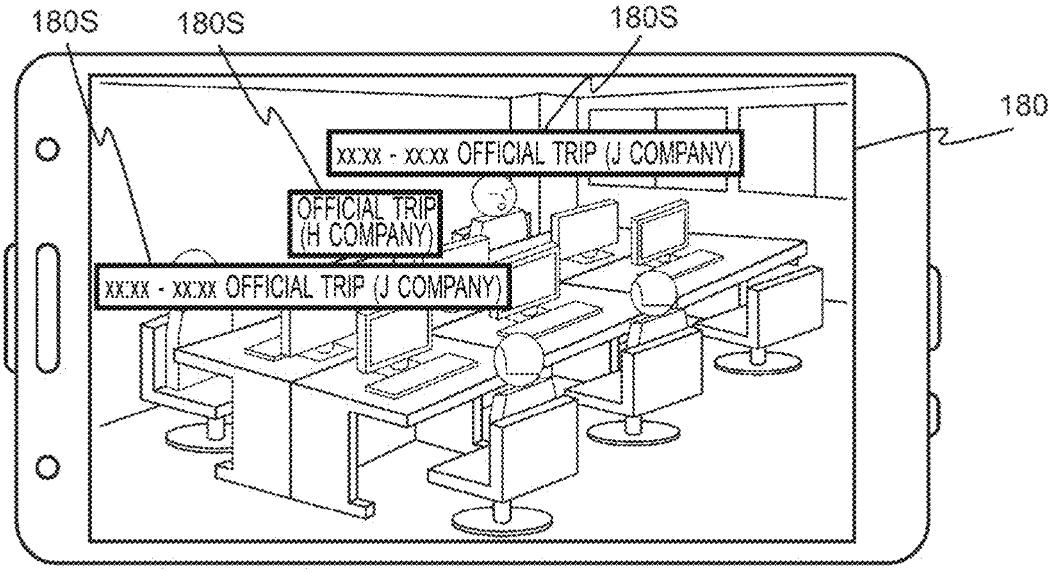

For example, as illustrated in FIG. 24G, regardless of whether assigned users are sitting on target seats, the activity schedule display unit 233 displays the activity schedule information 180S of the assigned users of the display target seats designated by the target marker 180M.

The seventh modification enables the user 910 to grasp, for example, a future schedule of a person who is present in a seat far from the user 910 of the information display device 100.

Eighth Modification

In the first embodiment and its modifications above, each information display device 100 generates the seat information table 250. Meanwhile, for example, the management server 300 may collectively manage the seat information table 250 in the storage 310 as the seat information table 315. In this case, each information display device 100 accesses the management server 300 to use the seat information table 250.

In this case, not all the information display devices 100 are required to perform the processing of generating the seat information table 250 individually. The seat information table 250 generated by any one of the information display devices 100 is shared therebetween, and each information display device 100 performs only processing of updating information of the seat information table 250.

In the eighth modification, the processing of generating the seat information table 250 in each information display device 100 becomes unnecessary, thereby reducing the processing load in each information display device 100.

Furthermore, managing the seat information table 250 by the management server 300 allows the seat information table 250 to always hold the latest information. In addition, it is possible to display the absentee information regardless of the information display device 100 used by the user 910.

Ninth Modification

For example, in the case where the management server 300 manages the seat information table 250, a valid assigned user of each seat is accurately registered therein. Accordingly, for example, steps of determining whether a person sitting on the designated display target seat is a valid assigned user may be further added to the processing of the first modification.

FIG. 26 illustrates a processing flow of the activity schedule display processing according to the ninth modification.

In this case, after cutting a vicinity area as a collation target image, the activity schedule display unit 233 performs the steps from step S1201 to step S1205 before the presence/absence determination unit 231 confirms the presence/absence of the user (step S1301), and specifies the personal ID 258 of a valid assigned user of a display target seat.

Thereafter, the presence/absence determination unit 231 determines the presence/absence of a person of the display target seat (step S1601).

When the presence/absence determination unit 231 determines that there is no person in the seat, the activity schedule display unit 233 proceeds to step S1206 and extracts and displays the activity schedule.

On the other hand, when determining in step S1601 that the user is present in the seat, the presence/absence determination unit 231 further determines whether the seated person is a valid assigned user (step S1602). In this processing, the identification image acquisition unit 218 extracts a person image, and the identification information collation unit 219 acquires the personal ID 312*c* from the member database 311. Then, the presence/absence determination unit 231 compares the acquired personal ID 312*c* with the personal ID 258 extracted in step S1205, and when the acquired personal ID 312*c* matches the personal ID 258, determines that the seated person is a valid assigned user. On the other hand, when the acquired personal ID 312*c* does not match the personal ID 258, the presence/absence determination unit 231 determines that the seated person is not a valid assigned user. In the case where a record that matches the person image (degree of matching is equal to or greater than a threshold) is not registered in the member database 311, the presence/absence determination unit 231 also determines that the seated person is not a valid assigned user.

In the case where the presence/absence determination unit 231 determines in step S1601 that a person is not present in the seat or determines in step S1602 that the seated person is not a valid assigned user, that is, in the case where the presence/absence determination unit 231 determines that a valid assigned user is not present in the display target seat, the activity schedule display unit 233 proceeds to step S1206 and displays the activity schedule of the valid assigned user of the display target seat.

On the other hand, when a valid assigned user is present in the display target seat, the activity schedule display unit 233 terminates the processing without performing any further steps.

According to the ninth modification, even when a person other than a valid assigned user of the seat is temporarily sitting on the display target seat, it is possible to reliably determine that the valid assigned user is absent, thereby enabling the user 910 to be provided with necessary information.

Tenth Modification

In the first embodiment, a person is identified by using a face image at the time of creating the seat information database. Meanwhile, a method for identifying a person is not limited thereto. For example, the identification of a person may be performed by analyzing and extracting information capable of identifying the person, such as an employee ID card carried by the seated person.

Second Embodiment

Next, a second embodiment of the present invention will be described. As illustrated in FIG. 27A, an activity schedule display system 900*a* of the second embodiment is based on the activity schedule display system 900 of the first embodiment, and further includes a camera 800.

At least one camera 800 is installed in each space (room) such that seats of all users whose activity schedules to be displayed are included in its photographing range. The camera 800 installed in this manner allows the information display device 100 to grasp the current state of the desired user's seat even when an object that obstructs the information display device 100, such as a wall, a partition, or furniture, exists.

Each camera 800 is a fixed camera that is fixed to capture images of a fixed photographing range at predetermined time intervals. As illustrated in FIG. 27B, the camera 800 of the second embodiment includes a photographing unit 811 configured to capture images (photographing) and a distance information acquisition unit 812 configured to acquire distance information. Each camera 800 includes, as a hardware configuration for implementing these functional units, for example, an imaging element such as a CCD, a distance sensor, a CPU, a ROM, and a RAM.

The images acquired (captured) by the photographing unit 811 is held in the management server 300. The management server 300 may be configured to hold only the latest image. The distance information acquisition unit 812 is an in-space distance information acquisition unit configured to acquire distance information to each object in a space corresponding to the photographing range of the camera 800. In the second embodiment, the distance information acquisition unit 812 acquires the distance information from the camera 800 to a display target seat.

The management server 300 further includes a camera arrangement table 314 in the storage 310. As illustrated in FIG. 28, the camera arrangement table 314 holds arrangement information of the camera 800 in each room, and access information to the latest image captured by each camera 800.

Specifically, for each camera 800, the camera arrangement table 314 holds a camera ID 314*b* serving as identification information of the camera 800, a room ID 314*a* serving as identification information of a room in which the camera 800 is arranged, camera arrangement information 314*c*, and an image storage address 314*f* serving as access information to the newest image. The camera arrangement information 314*c* includes camera position information 314*d* specified by the absolute value coordinates, and camera direction information 314*e* indicating a normal direction of a lens surface of the camera 800.

The second embodiment is basically configured in the same manner as the configurations of the first embodiment and its modifications. Hereinafter, the features different from those of the first embodiment and its modifications will be focused on and described in detail.

The seat information table generation processing performed by the seat information table generation unit 232 is the same as that of the first embodiment. The seat information table may be generated by using either absolute coordinates or relative coordinates.

Next, a flow of the activity schedule display processing of the second embodiment will be described.

FIG. 29 is a processing flow of the activity schedule display processing according to the second embodiment. This processing is started when the user 910 designates a predetermined position (designated position) on the input image 500. In the following, an example in which the user 910 is present in the room A illustrated in FIG. 30A. For example, as illustrated in FIG. 30B, when the user 910 designates a predetermined position on the touch screen 180, the target marker 180M is displayed at the designated position.

Firstly, the activity schedule display unit 233 acquires the position information and direction information of the information display device 100 in the same manner as the steps of the seat table generation process (step S1201, S1202).

Next, the activity schedule display unit 233 acquires distance information to the designated position (step S2101) to calculate position information of the designated position (step S2102). These steps are also the same as those of the distance information acquisition processing and position information acquisition processing for a display target seat according to the first embodiment.

Next, in the second embodiment, the activity schedule display unit 233 determines whether the designated position is a seat (step S2103). The activity schedule display unit 233 compares the position information of the designated position with the seat position information in the seat information table 250. When the position information of the designated position matches the seat position information in the seat information table 250, the activity schedule display unit 233 determines that the designated position is a seat, but when the position information of the designated position does not match the seat position information in the seat information table 250, the activity schedule display unit 233 determines that the designated position is not a seat.

When determining that the designated position is a seat (step S2103; YES), in the same manner as the first embodiment, the activity schedule display unit 233 extracts the personal ID 258 of a user of the seat (step S1205), acquires the activity schedule information from the activity schedule database 312 (step S1206), displays the acquired activity schedule information at the seat position (step S1207), and then terminates the processing.

On the other hand, when determining that the designated position is not a seat (step S2103; No), the activity schedule display unit 233 causes the display control unit 222 to delete the target marker 180M. The case where the designated position is not a seat is, for example, as illustrated in FIG. 30B, a case where a position other than a seat, such as a wall, is designated as the designated position.

Then, the activity schedule display unit 233 acquires, from the management server 300, list information 180L of images acquired by each camera 800, and causes the display control unit 222 to display the acquired list information 180L (step S2104). FIG. 31A illustrates a display example according to this case. As the list information 180L, the camera ID 314*b* may be displayed, or a thumbnail image generated based on the respective images may be displayed to receive selection of an image to be displayed from the user 910.

Upon receiving the selection of the image to be displayed from the user 910, the activity schedule display unit 233 acquires the image selected by the user 910, and causes the display control unit 222 to display the image by superimposing the image on the input image 500 displayed on the display unit 131 (step S2105). FIG. 31B illustrates a display mode in step S2105 above which is displayed on the display unit 131. An image 18CR is received at predetermined intervals, and updated at every reception timing.

The image 18CR may be directly received from the designated camera 800 via the LAN 410.

Thereafter, the activity schedule display unit 233 receives, on the image 180R, designation of a display target seat as a seat on which an activity schedule is requested be displayed from the user 910 (step S2106), calculates the position information of the display target seat (step S2107), performs step S1205 and the subsequent steps, and displays the activity schedule information in the same manner as described above.

The position information of the display target seat in S2107 is calculated as follows. Firstly, the seat position calculation unit 217 acquires the camera arrangement information 314*c* (camera position information 314*d* and camera direction information 314*e*) of the camera 800 that has acquired the selected image. The acquired camera position information 314*d* is used as a substitute for the position information of the information display device 100.

Furthermore, by using the acquired camera direction information 314*e* as a substitute for the direction information of the information display device 100, the same processing as the activity schedule display processing illustrated in FIG. 14 may be performed. The distance information to the display target seat may be acquired by the distance information acquisition unit 812 included in the camera 800.

In the case where each seat is fixed, the distance information to the display target seat may be acquired in advance by the distance information acquisition unit 812 of each camera 800, and held in the camera 800.

As described above, the activity schedule display system of the second embodiment is configured in the same manner as the first embodiment, and further includes the fixed camera 800 which is fixed in each independent space to capture an image of each space. The management server 300 holds the camera position information that is the position information of each camera 800, and the camera direction information that is the direction information of the camera 800. When the display target seat is a seat in an image captured by the camera 800, the seat position calculation unit 217 calculates the display seat position information by using the camera position information and the camera direction information.

According to the second embodiment, it is possible for the user 910 to know a schedule of an assigned user of a seat of a room that the user 910 cannot directly see.

The modifications of the first embodiment can be applied to the second embodiment.

The present invention is not limited to the embodiments and the modifications described above, and other various modifications are included therein. For example, the embodiments and the modifications described above have been explained in detail in order to clarify the present invention, but are not necessarily limited to those having all the configurations as described. In addition, a part of the configuration of the present embodiments and the modifications can be replaced with that of other embodiments and other modifications, and the configuration of other embodiments and other modifications can be added to the configuration of the present embodiment. Furthermore, it is possible to add, delete, or replace another configuration with respect to a part of the configuration of the present embodiments and the modifications.

Some or all the configurations described above, functions, processing units, and processing means may be implemented by hardware, for example, by designing them with an integrated circuit. In addition, the configurations and functions described above may be implemented by software by interpreting and executing programs in which the processor implements the respective functions. Information such as programs, tables, and files for implementing various functions can be placed in recording devices such as a memory, a hard disk, and an SSD (Solid State Drive), or recording media such as an IC card, an SD card, and a DVD.

Furthermore, the control lines and the information lines which are considered to be necessary for the purpose of explanation are indicated herein, but not all the control lines and the information lines of actual products are necessarily indicated. It may be considered that almost all the configurations are actually connected to each other.

REFERENCE SIGNS LIST

100: information display device, 100H: HMD, 100S: smartphone, 101: main controller, 102: system bus, 103: RAM, 109H: frame, 109S: casing, 110: storage, 120: operation reception unit, 121: operation key, 121P: power switch, 122: touch sensor, 123: touch panel, 124: fingerprint sensor, 125: LED, 130: image processing unit, 131: display unit, 132: image signal processing unit, 133: first image acquisition unit, 133L: left first image acquisition unit, 133R: right first image acquisition unit, 134: second image acquisition unit, 140: audio processing unit, 141: audio output unit, 141L: left audio output unit, 141R: right audio output unit, 141M: monaural speaker, 141S: stereo speaker, 142: audio signal processing unit, 143: audio input unit, 150: sensor unit, 151: GPS reception unit, 152: gyro sensor, 153: geomagnetic sensor, 154: acceleration sensor, 155: distance sensor, 160: communication processing unit, 161: LAN communication unit, 162: telephone network communication unit, 163: BT communication unit, 170: extended interface, 170U: USB terminal, 180: touch screen, 180L: list information, 180M: target marker, 18CR: image, 180S: activity schedule information

211: position information acquisition unit, 212: direction information acquisition unit, 213: distance information acquisition unit, 214: space recognition unit, 215: line-of-sight detection unit, 216: seat selection reception unit, 217: seat position calculation unit, 218: identification image acquisition unit, 219: identification information collation unit, 220: seat information confirmation unit, 221: activity schedule acquisition unit, 222: display control unit, 223: contact control unit, 231: presence/absence determination unit, 232: seat information table generation unit, 233: activity schedule display unit

250: seat information table, 251: seat information, 252: seat ID, 253: room ID, 254: seat position information, 256: user information, 257: name, 258: personal ID

300: management server, 301: main controller, 302: bus, 303: RAM, 310: storage, 311: member database, 311*a*: personal information, 311*b*: name, 311*c*: personal ID, 311*d*: face image for authentication, 311*e*: contact information, 312: activity schedule database, 312: personal information, 312*b*: name, 312*c*: personal ID, 312*d*: identification No., 312*e*: start date and time, 312*f*: end date and time, 312*g*: content, 312*h*: location, 312*i*: disclosure information, 312*j*: activity schedule information, 313: PC operation information table, 313*a*: personal information, 313*b*: name, 313*c*: personal ID, 313*d*: log-in ID, 313*e*: log-in PW, 313*f*: operation status, 313*g*: log-out time, 314: camera arrangement table, 314*a*: room ID, 314*b*: camera ID, 314*c*: camera arrangement information, 314*d*: camera position information, 314*e*: camera direction information, 314*f*: image storage address, 315: seat information table, 320: operation reception unit, 331: display unit, 332: image signal processing unit, 361: LAN communication unit

410: internal network, 420: gateway device, 430: external network, 440: GPS satellite, 450: mobile information terminal

500: input image, 511: registration target seat, 512: assigned user, 521: region, 522: face region, 523: predetermined region, 531: display target seat, 541: seat position, 551: presence image, 552: absence image, 560: seat, 561: broken line, 610: space information, 611: feature point, 612: seat, 622: display target seat, 650: reference position, 800: camera, 811: photographing unit, 812: distance information acquisition unit

900: activity schedule display system, 900*a*: activity schedule display system, 910: user, 958: reference direction, 959: normal direction, A: room, AA: real space, CC: image sensor center position, Ls: distance, Ls0: distance, Ls1: distance

The invention claimed is:

1. A control method of an information display device, comprising:

acquiring, using a GPS reception unit or an indoor positioning system of the information display device, display position information indicating a position of a display of the information display device;

acquiring, using a gyro sensor or a geomagnetic sensor of the information display device, display direction information indicating a direction the display is facing; and acquiring, using a depth sensor of the information display device, distance information indicating a distance from the display to a target seat to which a target user other than a device user of the information display device is assigned;

determining, based on the display direction information, a heading angle of the display with respect to a reference direction;

calculating a position of the target seat by geometrically computing coordinates of the target seat from the display position information, the heading angle, and the distance information;

extracting, from a seat information table including association between 1) positions of a plurality of seats and 2) user information of users assigned to the plurality of seats, target user information of the target user associated with the position of the target seat;

acquiring current activity schedule of the target user based on the target user information; and displaying the acquired current activity schedule of the target user on the display.

2. The control method according to claim 1, further comprising:

acquiring an image including the target user while the target user is present in the target seat to generate the seat information table;

acquiring an identification image to identify the target user associated with the target seat to be registered;

acquiring personal information to be registered in association with the identification image and use the acquired personal information as the user information;

acquiring a distance to the target seat as registration seat distance information, calculating the position of the target seat as registration seat position information by using the display position information, the display direction information, and the registration seat distance information; and registering the registration seat position information in association with assigned user information so as to generate the seat information table.

3. The control method according to claim 1, further comprising:

acquiring an image in a photographing range including the target seat; and when displaying the image of the target seat on the display, displaying the current activity schedule of the target user on a position of the display on which the target seat is displayed.

4. The control method according to claim 1, further comprising:

setting, as the target seat, a seat designated by the device user.

5. The control method according to claim 4, further comprising:

when the device user designates, as the target seat, one of the seats, before the position of the target seat is calculated, determining whether the target user assigned to the target seat is present in the target seat; and in a case where the target user is not present in the target seat, calculating a seat position of the target seat.

6. The control method according to claim 5, further comprising:

acquiring contact information of the target user together with the current activity schedule of the target user;

displaying the contact information together with the current activity schedule of the target user on the display; and establishing a communication path toward a contact address included in the contact information selected by the device user via the display.

7. The control method according to claim 1, further comprising acquiring the current activity schedule of the target user in a case where the current activity schedule of the target user is allowed to be disclosed to the device user.

8. The control method according to claim 1, further comprising acquiring future activity schedule of the target user.

9. The control method according to claim 1, further comprising:

acquiring PC (Personal Computer) operation information registered in association with the target user, and displaying the acquired PC operation information on the display.

10. The control method according to claim 2, wherein the identification image is a face image.

11. The control method according to claim 1, wherein the information display device is a head mounted display having a transmission type display in the display.

12. The control method according to claim 1, wherein the information display device is a mobile information terminal.

13. A control method of an information display device, comprising:

acquiring, using a GPS reception unit or an indoor positioning system of the information display device, display position information indicating a position of a display of the information display device;

acquiring, using a gyro sensor or a geomagnetic sensor of the information display device, display direction information indicating a direction the display is facing; and acquiring, using a depth sensor of the information display device, distance information indicating a distance from the display to a target seat to which a target user other than a device user of the information display device is assigned;

determining, based on the display direction information, a heading angle of the display with respect to a reference direction;

calculating a position of the target seat by geometrically computing coordinates of the target seat from the display position information, the heading angle, and the distance information;

extracting target user information of the target user associated with the position of the target seat;

acquiring current activity schedule of the target user based on the target user information; and displaying the acquired current activity schedule of the target user on the display.

14. The control method according to claim 13, further comprising:

acquiring an image in a photographing range including the target seat; and when displaying the image of the target seat on the display, displaying the current activity schedule of the target user on a position of the display on which the target seat is displayed.

15. The control method according to claim 13, further comprising setting, as the target seat, a seat designated by the device user.

16. The control method according to claim 15, further comprising:

when the device user designates, as the target seat, one of the seats, before the position of the target seat is calculated, determining whether the target user assigned to the target seat is present in the target seat; and in a case where the target user is not present in the target seat, calculating a seat position of the target seat.

17. The control method according to claim 16, further comprising:

acquiring contact information of the target user together with the current activity schedule of the target user;

displaying the contact information together with the current activity schedule of the target user on the display; and establishing a communication path toward a contact address included in the contact information selected by the device user via the display.

18. The control method according to claim 13, further comprising acquiring the current activity schedule of the target user in a case where the current activity schedule of the target user is allowed to be disclosed to the device user.

19. The control method according to claim 13, further comprising:

acquiring PC (Personal Computer) operation information registered in association with the target user; and displaying the acquired PC operation information on the display.

20. The control method according to claim 13, wherein the information display device is a head mounted display having a transmission type display in the display.

* * * * *